(12) United States Patent
Liu et al.

(10) Patent No.: US 12,176,969 B2
(45) Date of Patent: Dec. 24, 2024

(54) TERMINAL DEVICE AND METHOD FOR CONTROLLING TERMINAL DEVICE

(71) Applicant: Huawei Technologies Co., Ltd., Guangdong (CN)

(72) Inventors: Yanding Liu, Dongguan (CN); Weiliang Shu, Dongguan (CN); Furong Xiao, Beijing (CN); Qitang Liu, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 23 days.

(21) Appl. No.: 17/989,517

(22) Filed: Nov. 17, 2022

(65) Prior Publication Data
US 2023/0084747 A1    Mar. 16, 2023

Related U.S. Application Data

(63) Continuation of application No. PCT/CN2021/073369, filed on Jan. 22, 2021.

(30) Foreign Application Priority Data

May 19, 2020   (CN) .......................... 202010425200.7

(51) Int. Cl.
*H04B 5/79*     (2024.01)
*G06F 1/16*     (2006.01)
(Continued)

(52) U.S. Cl.
CPC ............... *H04B 5/79* (2024.01); *H02J 50/05* (2016.02); *H02J 50/12* (2016.02); *H02J 50/80* (2016.02);
(Continued)

(58) Field of Classification Search
CPC . H02J 50/12; H02J 50/80; H02J 50/10; H04B 5/79; H04B 5/24; H04B 5/26; H04B 5/266; H04B 5/43
See application file for complete search history.

(56) References Cited

U.S. PATENT DOCUMENTS

| | | | |
|---|---|---|---|
| 2016/0182263 A1* | 6/2016 | Ramakrishnan | H04B 5/72 375/300 |
| 2019/0305824 A1* | 10/2019 | Antonetti | H04B 5/77 |
| 2020/0335274 A1* | 10/2020 | Lu | H04B 5/79 |

FOREIGN PATENT DOCUMENTS

| | | |
|---|---|---|
| CN | 101931250 A | 12/2010 |
| CN | 104348515 A | 2/2015 |

(Continued)

OTHER PUBLICATIONS

Cairó, Josep Ignasi, et al. "Reconfigurable system for wireless power transfer (WPT) and near field communications (NFC)." IEEE Journal of Radio Frequency Identification 1.4 (2017): 253-259. (Year: 2017).*

*Primary Examiner* — Ryan Johnson
(74) *Attorney, Agent, or Firm* — WOMBLE BOND DICKINSON (US) LLP

(57) ABSTRACT

A terminal device and a method for controlling the terminal device are provided. The terminal device includes a display screen, a housing, a middle frame and a transmitting circuit. The transmitting circuit is disposed on a side of the middle frame and faces the housing. The transmitting circuit includes a matching network and a transmitting coil connected to the matching network. The matching network is configured to perform impedance matching on a received alternating current power signal and send the received alternating current power signal to the transmitting coil. The matching network includes a parallel resonant capacitor connected in parallel to the transmitting coil. The transmit- (Continued)

ting circuit further includes a resistance switching circuit connected in series to the parallel resonant capacitor.

13 Claims, 14 Drawing Sheets

(51) Int. Cl.
  *H02J 50/05* (2016.01)
  *H02J 50/12* (2016.01)
  *H02J 50/80* (2016.01)
  *H04B 5/22* (2024.01)
  *H04B 5/24* (2024.01)

(52) U.S. Cl.
  CPC ................ *H04B 5/22* (2024.01); *H04B 5/24* (2024.01); *G06F 1/1637* (2013.01)

(56) References Cited

FOREIGN PATENT DOCUMENTS

| | | | |
|---|---|---|---|
| CN | 105932888 | A | 9/2016 |
| CN | 106549505 | A | 3/2017 |
| CN | 107005280 | A | 8/2017 |
| CN | 206422576 | U | 8/2017 |
| CN | 111769655 | A | 10/2020 |
| CN | 111970666 | A | 11/2020 |

* cited by examiner

TERMINAL DEVICE AND METHOD FOR CONTROLLING TERMINAL DEVICE

CROSS-REFERENCE TO RELATED APPLICATIONS

This application is a continuation of International Application No. PCT/CN2021/073369, filed on Jan. 22, 2021, which claims priority to Chinese Patent Application No. 202010425200.7, filed on May 19, 2020, the disclosures of which are hereby incorporated by reference in their entirety.

TECHNICAL FIELD

This application relates to the field of electronic technologies, and in particular, to a quality factor adjustment for a transmitting apparatus of a terminal device.

BACKGROUND

Currently, many consumer terminal devices, such as smartphones, smart watches, and wristbands, have near field communication (NFC) functions, and are used for applications such as mobile payment, electronic ticketing, access control, mobile identity identification, and anti-counterfeiting. In the future, more consumer terminal devices will be equipped with the NFC communication functions. If an existing NFC communication module (including an NFC chip, a circuit, and a coil) in a mobile phone can be used to implement NFC reverse wireless charging of the mobile phone for wearable products such as a watch, a band, and a wireless headset, there will be great practical business value.

From a perspective of a circuit structure, NFC communication is very similar to NFC charging. A transmitting apparatus includes a transmitting chip, a filter circuit (usually an electromagnetic compatibility (EMC) network), a matching network, and a transmitting coil. Therefore, NFC communication and NFC charging may share most circuits. This implements compatibility between NFC communication and NFC charging. To be compatible with requirements of different NFC communication rates, a quality factor value Q of the transmitting coil is usually required to be small during NFC communication, for example, Q=20. If the NFC communication circuit and the transmitting coil are directly used for NFC wireless charging, because a value Q of the transmitting coil ($L_{tx}$) is low (alternating current impedance (ACR) is large), a loss of the transmitting coil for NFC charging is large, charging efficiency is low, and user experience is poor. To improve NFC charging efficiency, a larger value Q of the transmitting coil is usually required, for example, Q>60. Therefore, there is a conflict between NFC communication and NFC charging.

To resolve the foregoing problem, in the conventional technology, two transmitting coils may be used to share a transmitting chip. When the transmitting chip is configured to charge another terminal device, the transmitting chip switches to a coil with a high value Q. When the transmitting chip is configured to transmit a communication signal to another terminal device, the transmitting chip switches to a coil with a low value Q. Alternatively, a resistor may be connected in series or in parallel to the transmitting coil to adjust the value Q of the transmitting coil. In this way, because the value Q of the transmitting apparatus depends on the value Q of the coil, the foregoing problem is well resolved by using transmitting coils with different value Qs in different working modes of the transmitting apparatus. However, in the conventional technology, an improvement is mainly made by adjusting the value Q of the transmitting coil, and this is an undiversified manner.

SUMMARY

Embodiments of this application provide a terminal device and a method for controlling the terminal device, and provide a new solution for adjusting a value Q of a transmitting apparatus.

To achieve the foregoing objective, this application uses the following technical solutions.

According to a first aspect, a terminal device is provided, including a display screen, a housing, and a middle frame disposed between the display screen and the housing. A transmitting circuit is disposed on a side that is of the middle frame and that faces the housing. The transmitting circuit includes a matching network and a transmitting coil connected to the matching network. The matching network is configured to perform impedance matching on a received alternating current power signal and then the received alternating current power signal to the transmitting coil. The matching network includes a parallel resonant capacitor connected in parallel to the transmitting coil. The transmitting circuit further includes a resistance switching circuit connected in series to the parallel resonant capacitor. The resistance switching circuit is configured to adjust a quality factor value Q of the transmitting circuit by changing a resistance value of the resistance switching circuit.

In the foregoing solution, the transmitting circuit of the terminal device includes the matching network and the transmitting coil connected to the matching network. The matching network is configured to perform impedance matching on the received alternating current power signal and send the received alternating current power signal to the transmitting coil. The matching network includes the parallel resonant capacitor connected in parallel to the transmitting coil. The transmitting circuit further includes the resistance switching circuit connected in series with the parallel resonant capacitor. The resistance switching circuit is configured to adjust the value Q of the transmitting circuit by changing the resistance value of the resistance switching circuit. In this way, the resistance switching circuit can flexibly control the value Q of the transmitting circuit. When the terminal device performs wireless communication with another terminal device, the transmitting circuit can be switched to a lower value Q, thereby ensuring compatibility with requirements of different communication rates. When the terminal device wirelessly charges another terminal device, the transmitting circuit may be switched to a higher value Q, to reduce a charging loss and improve charging efficiency. In addition, because wireless communication and wireless charging share a group of transmitting coils, device costs are also reduced.

In an embodiment, the resistance switching circuit includes an adjustable resistor. The resistance switching circuit is configured to change a resistance value of the adjustable resistor to adjust the resistance value of the resistance switching circuit. Alternatively, the resistance switching circuit includes at least one switch and at least one resistor. The at least one switch and the at least one resistor form a resistance switching network. The resistance switching network is configured to change the resistance value of the resistance switching circuit by switching on and off the switch. For example, when the alternating current power signal is used to transmit a communication signal to another terminal device, the resistance switching circuit adjusts the resistance value of the resistance switching circuit to a first resistance value. When the alternating current power signal is used to charge the other terminal device, the resistance switching circuit adjusts the resistance value of the resistance switching circuit to a second resistance value. When the resistance switching circuit adjusts the resistance value of the resistance switching circuit to the first resistance value, the value Q of the transmitting circuit is a first value Q. When the resistance switching circuit adjusts the resistance value of the resistance switching circuit to the second resistance value, the value Q of the transmitting circuit is a second value Q. The first resistance value is greater than the second resistance value, and the first value Q is less than the second value Q. In this way, when the alternating current power signal is used to charge the other terminal device, the value Q of the transmitting circuit needs to be increased, and the resistance switching circuit switches a branch circuit in which the parallel resonant capacitor is located to a smaller second resistance value. When the alternating current power signal is used to transmit the communication signal to the other terminal device, the value Q of the transmitting circuit needs to be reduced. In this case, the resistance switching circuit switches the branch in which the parallel resonant capacitor is located to a larger first resistance value.

In an embodiment, when the terminal device is used for wireless communication, the alternating current power signal is usually a high-frequency alternating current signal, and includes a large quantity of high-order harmonic components. To avoid electromagnetic interference caused by the high-order harmonic component, the transmitting circuit further includes a filter circuit. The filter circuit is configured to filter an interference signal whose frequency exceeds a threshold frequency in the alternating current power signal. An inductor-capacitor LC filter circuit is used as the filter circuit.

In an embodiment, a specific structure of the matching network is further provided. The matching network and the transmitting coil form a resonant circuit. The matching network includes a series resonant capacitor and the parallel resonant capacitor. A first end of the series resonant capacitor is configured to receive the alternating current power signal. A second end of the series resonant capacitor is connected to a first end of the parallel resonant capacitor. A second end of the parallel resonant capacitor is connected to the ground. The resistance switching circuit is connected in series to the first end or the second end of the parallel resonant capacitor. For example, the resistance switching circuit includes an adjustable resistor. Alternatively, the resistance switching circuit includes a first switch and a first resistor. A first end of the first switch is connected to a first end of the first resistor. A second end of the first switch is connected to a second end of the first resistor. When the switching circuit is connected in series to the first end of the parallel resonant capacitor, the first end of the first switch is connected to the second end of the series resonant capacitor, and the second end of the first switch is connected to the first end of the parallel resonant capacitor. Alternatively, when the switching circuit is connected in series to the second end of the parallel resonant capacitor, the first end of the first switch is connected to the second end of the parallel resonant capacitor, and the second end of the first switch is connected to the ground.

In an embodiment, the matching network includes a first matching circuit and a second matching circuit. The first matching circuit and the transmitting coil form the resonant circuit, the second matching circuit and the transmitting coil form the resonant circuit. The first matching circuit includes a first series resonant capacitor and a first parallel resonant capacitor. The second matching circuit includes a second series resonant capacitor and a second parallel resonant capacitor. A first end of the first series resonant capacitor and a first end of the second series resonant capacitor are configured to receive the alternating current power signal. A second end of the first series resonant capacitor is connected to a first end of the first parallel resonant capacitor. A second end of the second series resonant capacitor is connected to a first end of the second parallel resonant capacitor. The resistance switching circuit is connected in series between a second end of the first parallel resonant capacitor and a second end of the second parallel resonant capacitor. Because an alternating current is usually used as the alternating current power signal, to improve utilization of a power supply, a differential signal may be used as the alternating current power signal. For example, the alternating current power signal includes a first differential signal and a second differential signal. In this way, the first end of the first series resonant capacitor is configured to receive the first differential signal in the alternating current power signal. The first end of the second series resonant capacitor is configured to receive the second differential signal in the alternating current power signal.

In an embodiment, a specific form of the resistance switching circuit is further provided, including the following: The resistance switching circuit includes a first resistor, a second resistor, a first switch, and a second switch. A first end of the first switch is connected to a first end of the first resistor. A first end of the second switch is connected to a first end of the second resistor. A second end of the first switch is connected to a second end of the second switch. A second end of the first resistor is connected to a second end of the second resistor. The second end of the second switch is connected to the ground. A second end of the second resistor is connected to the ground. The first end of the first resistor is connected to the second end of the first parallel resonant capacitor. The first end of the second resistor is connected to the second end of the second parallel resonant capacitor. Alternatively, the resistance switching circuit includes a first resistor, a first switch, and a second switch. A first end of the first switch is connected to a first end of the first resistor. A second end of the second switch is connected to a second end of the first resistor. A second end of the first switch is connected to the second end of the second switch. The second end of the first switch is connected to the ground. The first end of the first resistor is connected to the second end of the first parallel resonant capacitor. The second end of the first resistor is connected to the second end of the second parallel resonant capacitor. Alternatively, the resistance switching circuit includes a first switch, a first resistor, and a second resistor. A first end of the first switch is connected to a first end of the first resistor. A second end of the first switch is connected to a first end of the second resistor. A second end of the first resistor is connected to a second end of the second resistor. The second end of the first resistor is connected to the ground. The first end of the first resistor is connected to the second end of the first parallel resonant capacitor. The first end of the second resistor is connected to the second end of the second parallel resonant capacitor. Alternatively, the resistance switching circuit includes a first switch and a first resistor. A first end of the first switch is connected to a first end of the first resistor. A second end of the first switch is connected to a second end of the first resistor. The first end of the first resistor is connected to the second end of the first parallel resonant capacitor. The second end of the first resistor is connected to the second end of the second parallel resonant capacitor. Alternatively, the resistance switching circuit includes an adjustable resistor.

In an embodiment, when the terminal device is used for wireless communication, the alternating current power signal is usually a high-frequency alternating current signal, and includes a large quantity of high-order harmonic components. To avoid electromagnetic interference caused by the high-order harmonic component, the transmitting circuit further includes a first filter circuit. The first filter circuit is configured to filter interference signals that exceed a threshold frequency in the first differential signal. The transmitting circuit further includes a second filter circuit. The second filter circuit is configured to filter interference signals that exceed the threshold frequency in the second differential signal. The first filter circuit and the second filter circuit may be LC filter circuits.

According to a second aspect, a method for controlling a terminal device according to the first aspect is provided. The method includes the following operations: controlling a resistance switching circuit to adjust a value Q of a transmitting circuit by changing a resistance value of the resistance switching circuit.

The controlling a resistance switching circuit to adjust a value Q of a transmitting circuit by changing a resistance value of the resistance switching circuit includes: when it is determined that an alternating current power signal is used to charge another terminal device, controlling the resistance switching circuit to adjust the resistance value of the resistance switching circuit to a second resistance value; and when it is determined that the alternating current power signal is used to transmit a communication signal to another terminal device, controlling the resistance switching circuit to adjust the resistance value of the resistance switching circuit to a first resistance value. When the resistance switching circuit adjusts the resistance value of the resistance switching circuit to the first resistance value, the value Q of the transmitting circuit is a first value Q. When the resistance switching circuit adjusts the resistance value of the resistance switching circuit to the second resistance value, the value Q of the transmitting circuit is a second value Q. The first resistance value is greater than the second resistance value, and the first value Q is less than the second value Q.

In an embodiment, before the controlling a resistance switching circuit to adjust a value Q of a transmitting circuit by changing a resistance value of the resistance switching circuit, the method includes: detecting a type of the other terminal device, and determining, based on the type of the other terminal device, that the alternating current power signal is used to charge the other terminal device, or that the alternating current power signal is used to transmit the communication signal to the other terminal device.

For technical effects brought by any design of the second aspect, refer to the technical effects brought by different designs of the first aspect. Details are not described herein again.

According to a third aspect, a terminal device is provided, including a display screen, a housing, and a middle frame disposed between the display screen and the housing. A transmitting circuit is disposed on a side that is of the middle frame and that faces the housing. The transmitting circuit includes a filter circuit, a matching network connected to the filter circuit, and a transmitting coil connected to the matching network. The filter circuit is configured to filter a received alternating current power signal. The matching network is configured to perform impedance matching on the filtered alternating current power signal and then send the filtered alternating current power signal to the transmitting coil. The filter circuit uses an inductor-capacitor LC filter circuit. The filter circuit includes a filter capacitor. The transmitting circuit further includes a resistance switching circuit connected in series to the filter capacitor. The resistance switching circuit is configured to adjust a value Q of the transmitting circuit by changing a resistance value of the resistance switching circuit. In the foregoing solution, the transmitting circuit of the terminal device includes the filter circuit, the matching network, and the transmitting coil. The filter circuit is connected to the transmitting chip. The matching network is separately connected to the filter circuit and the transmitting coil. The filter circuit is configured to filter the received alternating current power signal. The matching network is configured to perform impedance matching on the filtered alternating current power signal and send the filtered alternating current power signal to the transmitting coil. The filter circuit uses the inductor-capacitor LC filter circuit. The filter circuit includes a filter capacitor $C_{01}$. The transmitting circuit further includes the resistance switching circuit connected in series to the filter capacitor $C_{01}$. The resistance switching circuit is configured to adjust the value Q of the transmitting circuit by changing the resistance value of the resistance switching circuit. In this way, the resistance switching circuit can flexibly control the value Q of the transmitting circuit. When the terminal device performs wireless communication with another terminal device, the transmitting circuit can be switched to a lower value Q, thereby ensuring compatibility with requirements of different communication rates. When the terminal device wirelessly charges another terminal device, the transmitting circuit may be switched to a higher value Q, to reduce a charging loss and improve charging efficiency. In addition, because wireless communication and wireless charging share a group of transmitting coils, device costs are also reduced.

In an embodiment, the resistance switching circuit includes an adjustable resistor. The resistance switching circuit is configured to change a resistance value of the adjustable resistor to adjust the resistance value of the resistance switching circuit. Alternatively, the resistance switching circuit includes at least one switch and at least one resistor. The at least one switch and the at least one resistor form a resistance switching network. The resistance switching network is configured to change the resistance value of the resistance switching circuit by switching on and off the switch. For example, when the alternating current power signal is used to transmit a communication signal to another terminal device, the resistance switching circuit adjusts the resistance value of the resistance switching circuit to a first resistance value. When the alternating current power signal is used to charge the other terminal device, the resistance switching circuit adjusts the resistance value of the resistance switching circuit to a second resistance value. When the resistance switching circuit adjusts the resistance value of the resistance switching circuit to the first resistance value, the value Q of the transmitting circuit is a first value Q. When the resistance switching circuit adjusts the resistance value of the resistance switching circuit to the second resistance value, the value Q of the transmitting circuit is a second value Q. The first resistance value is greater than the second resistance value, and the first value Q is less than the second value Q. In this way, when the alternating current power signal is used to charge the other terminal device, the value Q of the transmitting circuit needs to be increased, and the resistance switching circuit switches a branch in which the parallel resonant capacitor is located to a smaller second resistance value. When the alternating current power signal is used to transmit the communication signal to the other terminal device, the value Q of the transmitting circuit needs to be reduced. In this case, the resistance switching circuit switches the branch in which the parallel resonant capacitor is located to a larger first resistance value.

In an embodiment, the filter circuit includes a filter inductor and a filter capacitor. A first end of the filter inductor is configured to receive the alternating current power signal. A second end of the filter inductor is connected to a first end of the filter capacitor. A second end of the filter capacitor is connected to the ground. The second end of the filter inductor is connected to the matching network. The resistance switching circuit is connected in series to the first end or the second end of the filter capacitor. The resistance switching circuit includes a first switch and a first resistor. A first end of the first switch is connected to a first end of the first resistor. A second end of the first switch is connected to a second end of the first resistor. When the resistance switching circuit is connected in series to the first end of the filter capacitor, the first end of the first switch is connected to the second end of the filter inductor, and the second end of the first switch is connected to the first end of the filter capacitor. Alternatively, when the resistance switching circuit is connected in series to the second end of the filter capacitor, the first end of the first switch is connected to the second end of the filter capacitor, and the second end of the first switch is connected to the ground.

In an embodiment, the matching network includes a series resonant capacitor and a parallel resonant capacitor. A first end of the series resonant capacitor is connected to the filter circuit. A second end of the series resonant capacitor is connected to the first end of the transmitting coil. The second end of the series resonant capacitor is connected to the first end of the parallel resonant capacitor. The second end of the parallel resonant capacitor is connected to the ground.

In an embodiment, the filter circuit includes a first filter circuit and a second filter circuit. The first filter circuit includes a first filter inductor and a first filter capacitor. The second filter circuit includes a second filter inductor and a second filter capacitor. A first end of the first filter inductor and a first end of the second filter inductor are configured to receive the alternating current power signal. A second end of the first filter inductor is connected to a first end of the first filter capacitor. The second end of the first filter inductor is connected to the matching network. A second end of the second filter inductor is connected to a first end of the second filter capacitor. The second end of the second filter inductor is connected to the matching network. The resistance switching circuit is connected in series between a second end of the first filter capacitor and a second end of the second filter capacitor. The first filter circuit and the second filter circuit may be LC filter circuits. Because an alternating current is usually used as the alternating current power signal, to improve utilization of a power supply, a differential signal is used as the alternating current power signal. For example, the alternating current power signal includes a first differential signal and a second differential signal. In this way, the first end of the first filter inductor is configured to receive the first differential signal in the alternating current power signal. The first end of the second filter inductor is configured to receive the second differential signal in the alternating current power signal.

In an embodiment, a specific form of the resistance switching circuit is further provided, including the following: The resistance switching circuit includes a first resistor, a second resistor, a first switch, and a second switch. A first end of the first switch is connected to a first end of the first resistor. A first end of the second switch is connected to a first end of the second resistor. A second end of the first switch is connected to a second end of the second switch. A second end of the first resistor is connected to a second end of the second resistor. The second end of the second switch is connected to the ground. A second end of the second resistor is connected to the ground. The first end of the first resistor is connected to the second end of the first filter capacitor. The first end of the second resistor is connected to the second end of the second filter capacitor. Alternatively, the resistance switching circuit includes a first resistor, a first switch, and a second switch. A first end of the first switch is connected to a first end of the first resistor. A second end of the second switch is connected to a second end of the first resistor. A second end of the first switch is connected to the second end of the second switch. The second end of the first switch is connected to the ground. The first end of the first resistor is connected to the second end of the first filter capacitor. The second end of the first resistor is connected to the second end of the second filter capacitor. Alternatively, the resistance switching circuit includes a first switch, a first resistor, and a second resistor. A first end of the first switch is connected to a first end of the first resistor. A second end of the first switch is connected to a first end of the second resistor. A second end of the first resistor is connected to a second end of the second resistor. The second end of the first resistor is connected to the ground. The first end of the first resistor is connected to the second end of the first filter capacitor. The first end of the second resistor is connected to the second end of the second filter capacitor. Alternatively, the resistance switching circuit includes a first switch and a first resistor. A first end of the first switch is connected to a first end of the first resistor. A second end of the first switch is connected to a second end of the first resistor. The first end of the first resistor is connected to the second end of the first filter capacitor. The second end of the first resistor is connected to the second end of the second filter capacitor. Alternatively, the resistance switching circuit includes an adjustable resistor.

In an embodiment, the matching network includes a first matching circuit and a second matching circuit. An input end of the first matching circuit is connected to the first filter circuit, and is configured to receive the first differential signal that is obtained after filtering processing and that is output by the first filter circuit. An input end of the second matching circuit is connected to the second filter circuit, and is configured to receive the second differential signal that is obtained after the filtering processing and that is output by the second filter circuit. An output end of the first matching circuit is connected to the first end of the transmitting coil. An output end of the second matching circuit is connected to a second end of the transmitting coil.

According to a fourth aspect, a method for controlling a terminal device according to the third aspect is provided. The method includes the following operations: controlling a resistance switching circuit to adjust a value Q of a transmitting circuit by changing a resistance value of the resistance switching circuit.

The controlling a resistance switching circuit to adjust a value Q of a transmitting circuit by changing a resistance value of the resistance switching circuit includes: when it is determined that an alternating current power signal is used to charge another terminal device, controlling the resistance switching circuit to adjust the resistance value of the resistance switching circuit to a second resistance value; and when it is determined that the alternating current power signal is used to transmit a communication signal to another terminal device, controlling the resistance switching circuit to adjust the resistance value of the resistance switching circuit to a first resistance value. When the resistance switching circuit adjusts the resistance value of the resistance switching circuit to the first resistance value, the value Q of the transmitting circuit is a first value Q. When the resistance switching circuit adjusts the resistance value of the resistance switching circuit to the second resistance value, the value Q of the transmitting circuit is a second value Q. The first resistance value is greater than the second resistance value, and the first value Q is less than the second value Q.

In an embodiment, before the controlling a resistance switching circuit to adjust a value Q of a transmitting circuit by changing a resistance value of the resistance switching circuit, the method further includes: detecting a type of the other terminal device, and determining, based on the type of the other terminal device, that the alternating current power signal is used to charge the other terminal device, or that the alternating current power signal is used to transmit the communication signal to the other terminal device.

For technical effects achieved in any design of the fourth aspect, refer to technical effects achieved in different designs of the third aspect. Details are not described herein again.

DETAILED DESCRIPTION

The following describes the technical solutions in embodiments of this application with reference to the accompanying drawings in embodiments of this application. It is clear that the described embodiments are merely a part rather than all of embodiments of this application.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more of the features.

In addition, in this application, position terms such as "top" and "bottom" are defined relative to positions of components in the accompanying drawings. It should be understood that these position terms are relative concepts used for relative description and clarification, and may correspondingly change based on changes in the positions of the components in the accompanying drawings.

In this application, unless otherwise specified and limited, the term "connection" should be understood in a broad sense. For example, the term "connection" may be a manner of implementing an electrical connection for signal transmission, may be a direct electrical connection, or may be an indirect electrical connection by using an intermediate medium. In the following solutions, a switch has two states: short-circuited and open-circuited. In some solutions, short-circuited is also referred to as closed, on, switched on, turned on, and the like. Open-circuited is also referred to as open, off, switched off, and the like.

Embodiments of this application are used in a wireless interaction system. The wireless interaction system includes a first terminal device 01 and a second terminal device 02 shown in FIG. 1. Wireless interaction may include functions such as wireless charging and wireless communication that use energy transmission as a medium.

The first terminal device 01 and the second terminal device 02 include a mobile phone (mobile phone), a tablet computer (pad), a computer with a wireless transceiver function, an intelligent wearable product (for example, a smartwatch or a smart band), a virtual reality (VR) terminal device, a wireless device such as an augmented reality (AR) terminal device and the like. A specific form of the terminal device is not specially limited in embodiments of this application. For ease of description, the following uses an example in which the first terminal device 01 is a mobile phone and the second terminal device 02 is a smartwatch for description. The following solution is described by using an example in which wireless communication between the mobile phone and the smartwatch or wireless charging of the smartwatch by the mobile phone is used. Wireless communication between the mobile phone and the smartwatch may be NFC wireless communication.

Figure 1:
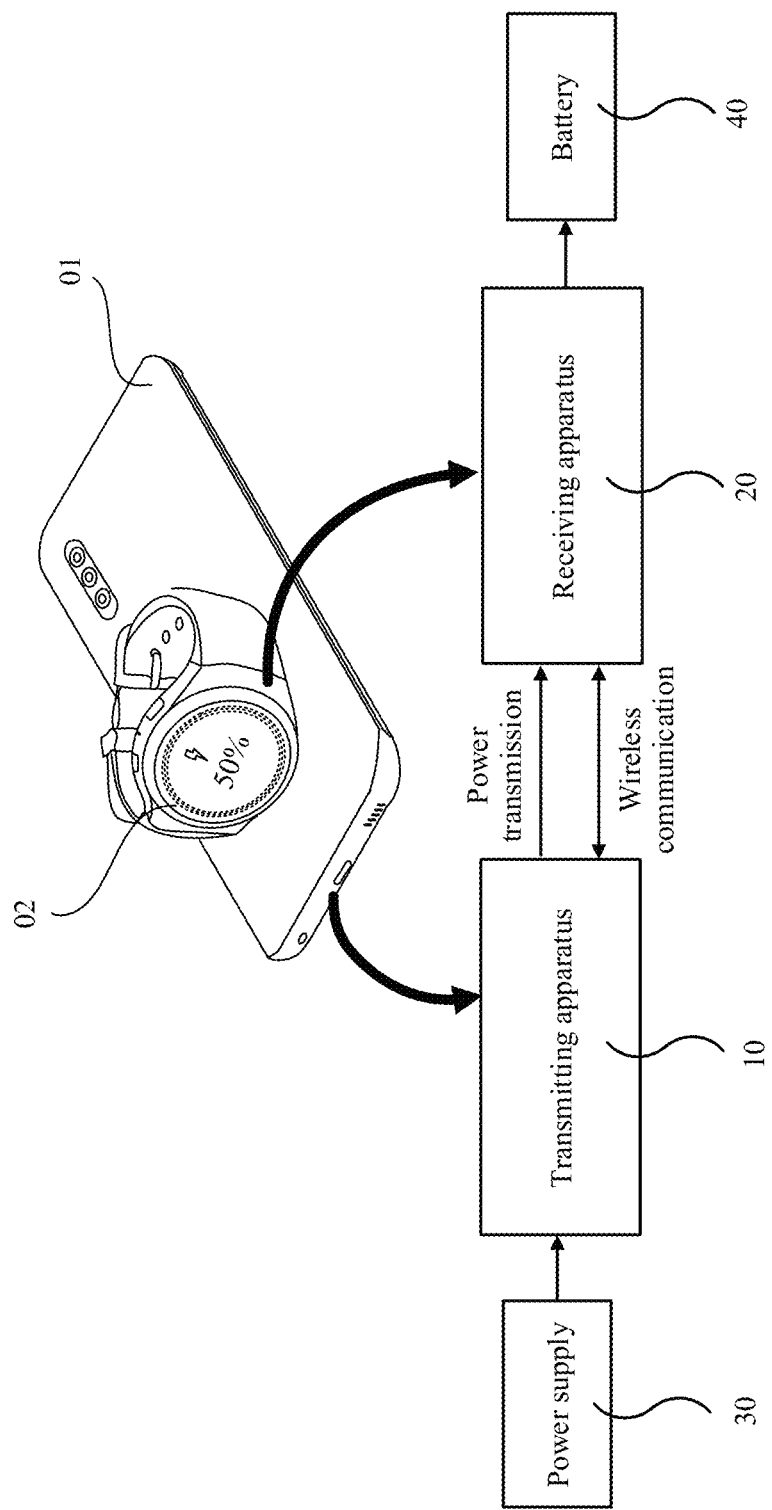
FIG. 1 is a schematic diagram of a structure of a wireless interaction system according to an embodiment of this application.
Figure 2:
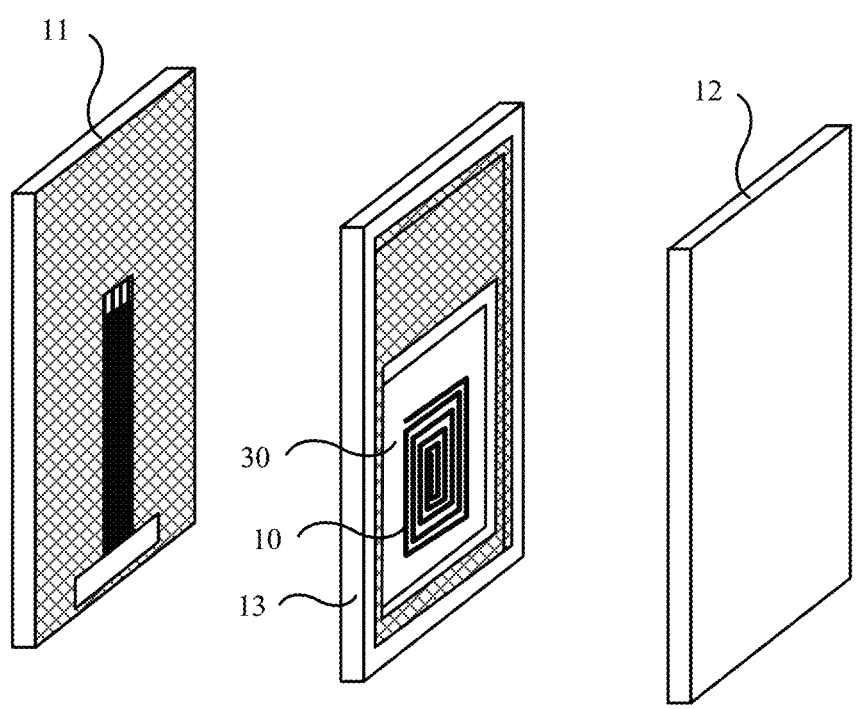
FIG. 2 is a schematic diagram of a structure of a terminal device according to an embodiment of this application.

NFC wireless communication is used as an example. To implement NFC wireless communication with the foregoing second terminal device 02, as shown in FIG. 1, a transmitting apparatus is disposed in the first terminal device 01. When the first terminal device 01 is the mobile phone, as shown in FIG. 2, the first terminal device 01 mainly includes a display screen (DP) 11. The display screen 11 may be a liquid crystal display (LCD) panel or an organic light emitting diode (OLED) display panel. This is not limited in this application. The first terminal device 01 further includes a middle frame 13 and a housing 12 shown in FIG. 2. The display screen 11 and the housing 12 are separately located on two sides of the middle frame 13. A back facet of the display screen 11 faces the housing 12, and the display screen 11 is connected to the housing 12 through the middle frame 13. A transmitting apparatus 10 and a power supply 30 (which may be a battery) may be disposed on a surface of a side that is of the middle frame 13 and that faces the housing 12.

The first terminal device 01 includes the transmitting apparatus 10 disposed in the first terminal device 01 shown in FIG. 1, and the power supply 30 connected to the transmitting apparatus 10. The power supply 30 is configured to supply electric energy to the transmitting apparatus 10. In some embodiments of this application, the power supply 30 may be a battery of the mobile phone, or may be connected to a power adapter of the mobile phone. When the power adapter is used, an alternating current of 220 V can be converted into a direct current (for example, 5 V or 10 V), and the direct current can be transmitted to the transmitting apparatus 10. The second terminal device 02 includes a receiving apparatus 20 disposed in the second terminal device 02 shown in FIG. 1. In some examples, the second terminal device 02 further includes a battery 40 connected to the receiving apparatus 20. In some embodiments of this application, the transmitting apparatus 10 is configured to send transmit power to the receiving apparatus 20. The transmit power is used to transmit a communication signal to the second terminal device, to implement NFC wireless communication. In this way, the first terminal device 01 is used for a transmit terminal device, and the second terminal device 02 is used for a receive terminal device.

Figure 3:
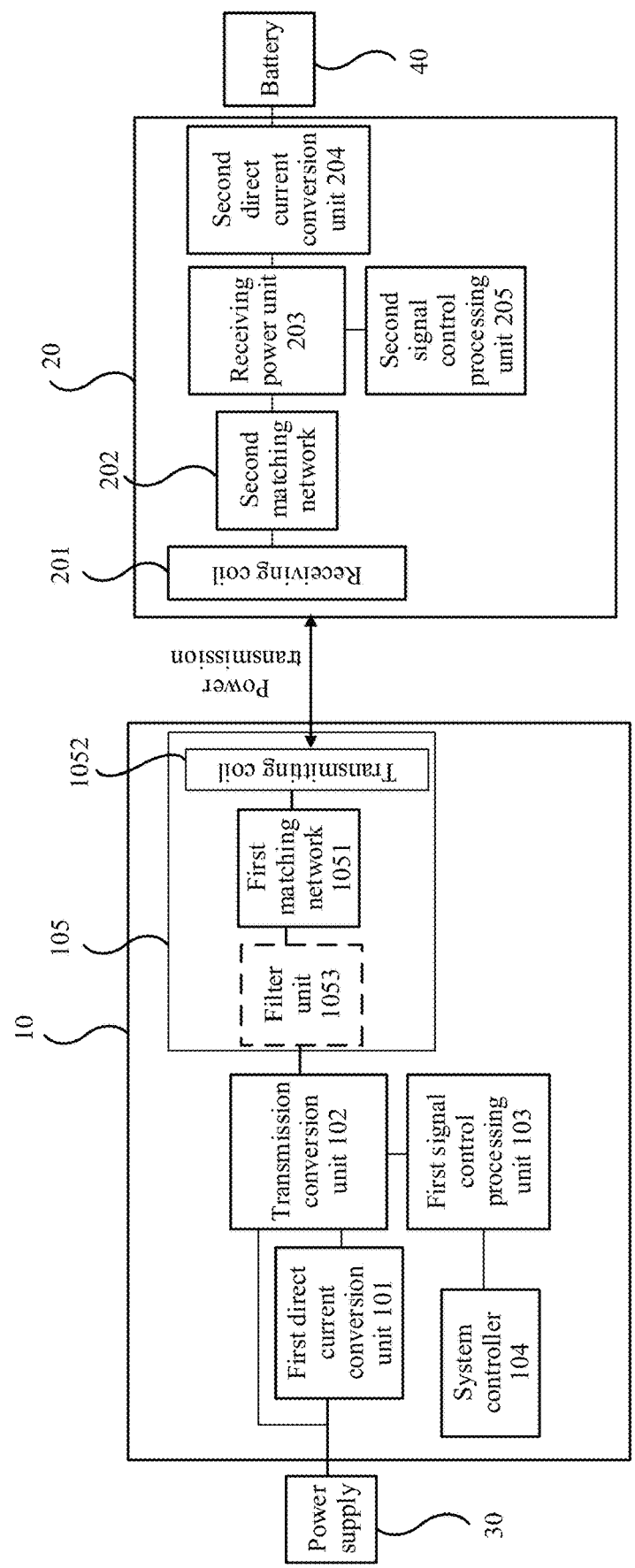
FIG. 3 is a schematic diagram of a structure of a wireless interaction system according to another embodiment of this application.

As shown in FIG. 3, to implement NFC wireless communication of the first terminal device, the transmitting apparatus 10 includes a first direct current conversion unit 101 connected to the power supply 30, a transmission conversion unit 102 coupled to the power supply 30 and a first direct current conversion unit 101, and a first signal control processing unit 103 connected to the transmission conversion unit 102. A transmitting circuit 105 includes a first matching network 1051 connected to the transmission conversion unit 102 and a transmitting coil 1052 connected to the first matching network 1051. In NFC wireless communication, the transmitting coil 1052 is usually an NFC coil.

In an embodiment, the first direct current conversion unit 101 may be a converter, for example, a BUCK converter, a BOOST converter, a BUCK-BOOST converter, or a linear power supply. The first direct current conversion unit 101 is mainly configured to obtain energy from the power supply 30, and supply a required voltage and current to the transmission conversion unit 102 through the first direct current conversion unit 101. The transmission conversion unit 102 may be a voltage converter, and may be a direct current (DC)-to-alternating current (AC) converter, that is, DC/AC. The transmission conversion unit 102 is mainly configured to convert, under control of the first signal control processing unit 103, a direct current from the power supply 30 or the direct current conversion unit 101 into an alternating current power signal of a voltage/current required for wireless power transmission of the transmitting coil 1052. For example, when the NFC wireless communication function is implemented, the alternating current power signal may be a high-frequency alternating current (used for NFC wireless communication). The transmission conversion unit 102 may be the DC/AC. The first signal control processing unit 103 is mainly configured to output a drive signal (for example, a PWM signal) to the transmission conversion unit 102, to ensure direct current-alternating current signal conversion when the transmission conversion unit 102 implements the NFC wireless communication function. The first matching network (matching network) 1051 is a circuit network mainly including one or more of components such as an inductor, a capacitor, and a resistor, and is configured to adjust impedance connected to the transmitting coil 1052, to meet a power output requirement of the power supply 30 or the first direct current conversion unit 101. The first matching network may also be referred to as a compensation circuit, a compensation network, a matching circuit, or the like in some embodiments. The first matching network 1051 and the transmitting coil 1052 form an oscillation circuit, to convert an alternating current power signal output by the transmission conversion unit 102 into an alternating magnetic field. In addition, the transmitting circuit 105 further includes a filtering unit 1053 connected between the transmitting transmission conversion unit 102 and the first matching network 1051. The filtering unit 1053 may use an electromagnetic compatibility (EMC) network (or referred to as a filtering network). The EMC network mainly includes a network formed by inductors and capacitors in series or parallel, for example, may use a resonant circuit (also referred to as an LC (loop-capacitor, coil or inductor-capacitor) circuit). In a process of a wireless communication function, the transmission conversion unit 102 sends a high-frequency square wave, including a larger quantity of high-order harmonic components. If the high-frequency square wave is transmitted from the transmitting coil 1052 without any processing, severe electromagnetic interference is caused. After passing through the filter unit 1053, a relatively clean high-frequency sine wave may be obtained. Generally, in NFC wireless communication, a high-frequency sine wave sent by a transmitting coil is usually about 13.56 MHz.

The foregoing describes in detail an implementation when the transmitting apparatus is used to implement NFC wireless communication. Considering that an existing transmitting apparatus in the mobile phone (because the transmitting apparatus is mainly used for NFC wireless communication in the foregoing description, the transmitting apparatus may also be referred to as an NFC communication module) may be used to implement NFC wireless charging of the mobile phone for wearable products such as a watch, a band, and a wireless headset, there may be great actual business value. In addition, from a perspective of a circuit structure, NFC wireless communication and NFC charging are very similar. Therefore, NFC wireless communication and NFC charging have a great possibility of circuit reusing. This implements compatibility between NFC wireless communication and NFC wireless charging. For example, when the wireless charging function is implemented, the transmitting apparatus shown in FIG. 3 is still used as an example. A main difference lies in that: Under control of the signal control processing unit 103, the transmission conversion unit 102 converts a direct current from the power supply 30 or the direct current conversion unit 101 into a low-frequency alternating current (used for wireless charging) required by the transmitting coil 1052 for wireless power transmission. However, because the transmitting coil 1052 is reused for NFC wireless communication and wireless charging, to be compatible with requirements of different NFC communication rates, a quality factor value Q of the transmitting coil is usually required to be small during NFC communication, for example, Q=20. If the transmitting apparatus is directly used for NFC wireless charging, because the value Q of the transmitting coil (1052) is lower (ACR is larger), a loss of the transmitting coil is large, charging efficiency is low, and user experience is poor during NFC charging. To improve NFC wireless charging efficiency, a larger value Q of the transmitting coil is usually required, for example, Q>60. Therefore, NFC wireless communication and NFC wireless charging have a contradiction of a value Q requirement. In this application, a resistance switching circuit is disposed in the first matching network 1051 or the filter unit 1053. Therefore, during NFC wireless communication or NFC wireless charging, the resistance switching circuit switches the transmitting circuit to different value Qs, to adapt to a requirement of NFC wireless communication or NFC wireless charging on the value Q.

In addition, to implement wireless communication with the second terminal device 02 or wirelessly charging of the second terminal device 02, the receiving apparatus 20 includes a receiving coil 201, a second matching network 202 connected to the receiving coil 201, a receive power unit 203 connected to the second matching network 202, and a second direct current conversion unit 204 connected to the receive power unit 203. The second direct current conversion unit 204 is connected to a battery 40. The receiving coil 201 is configured to receive an alternating magnetic field sent by the transmitting coil 1052 and generate an alternating current. For example, when NFC wireless communication is implemented, the alternating current may be a high-frequency alternating current. When NFC wireless charging is implemented, the alternating current may be a low-frequency alternating current. The second matching network 202 mainly includes a circuit network including one or more of components such as an inductor, a capacitor, and a resistor, and is configured to adjust impedance connected to the receiving coil 201, to match impedance at a receive terminal to impedance (resistive, inductive, or capacitive) of a corresponding characteristic. The receive power unit 203 may be a rectifier, and may be an alternating current-to-direct current converter, that is, AC/DC. The receive power unit 203 is mainly configured to convert, under control of a second signal control processing unit 205, an alternating current sensed by the receiving coil 201 into a direct current. The direct current is used to provide energy required by the second signal control processing unit 205, or provide energy for the second direct current conversion unit 204 to process, or charge the battery 40. The second signal control processing unit 205 is mainly configured to output a drive signal to the receive power unit 203, to ensure that the receive power unit 203 implements signal conversion in NFC wireless communication or NFC wireless charging. The second direct current conversion unit 204 (which may be a BUCK converter, a BOOST converter, a BUCK-BOOST converter, a linear power supply, or the like) is configured to convert the direct current obtained by the receive power unit 203 into a direct current of other voltages and currents, to meet the charging requirement of the battery 40. In addition, the transmitting coil and the receiving coil may be NFC coils.

In addition, to control the foregoing wireless charging or wireless communication process, after a wireless connection is established between the transmitting apparatus 10 and the receiving apparatus 20 by using NFC wireless communication, a control signal or charging data may be transmitted. The charging data may be used to indicate a charging type. For example, the charging data may be a charging protocol, for example, a protocol indicating an NFC charging function, or another wireless charging standard Qi pushed by a wireless power consortium (WPC), for example, a BPP (basic power profile) protocol, or an EPP (extended power profile) protocol. Certainly, the foregoing control signal or charging data may also be transmitted in another wireless communication manner on the mobile phone, for example, Bluetooth (bluetooth), wireless-fidelity (Wi-Fi), ZigBee protocol (Zigbee), radio frequency identification technology (RFID), and long range (Lora) wireless technology. In this way, based on the control signal or the charging data, the first terminal device may identify that the first terminal device currently needs to charge another terminal device or transmit a communication signal to another terminal device. In this way, the resistance switching circuit is controlled to adjust the value Q of the transmitting circuit.

In addition, as shown in FIG. 3, the transmitting apparatus 10 further includes a system controller 104 connected to the first signal control processing unit 103. The system controller 104 may identify the control signal or the transmitted charging data, to determine an operation to be performed by the first terminal device 01 and the second terminal device 02, for example, NFC wireless communication or NFC wireless charging.

This embodiment of this application mainly relates to improvement of a transmitting circuit of a terminal device. In the foregoing solution, the first direct current conversion unit 101, the transmission conversion unit 102, the first signal control processing unit 103, and the system control unit 104 may be integrated into a same chip, for example, a transmitting chip. Certainly, functions of the first direct current conversion unit 101, the transmission conversion unit 102, the first signal control processing unit 103, and the system control unit 104 may also be separately implemented in different circuits or chips.

Figure 4:
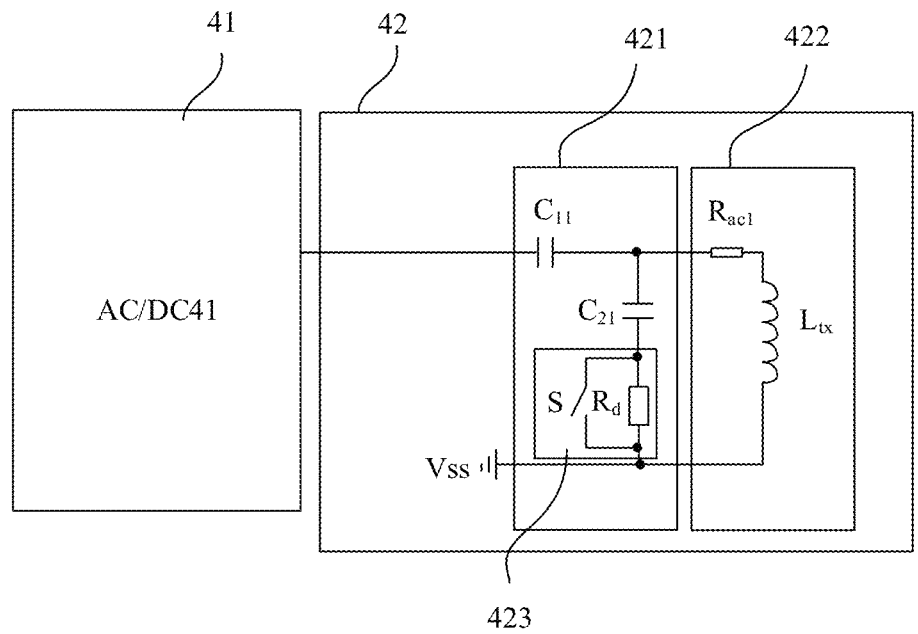
FIG. 4 is a schematic diagram of a structure of a transmitting circuit according to an embodiment of this application.
Figure 5:
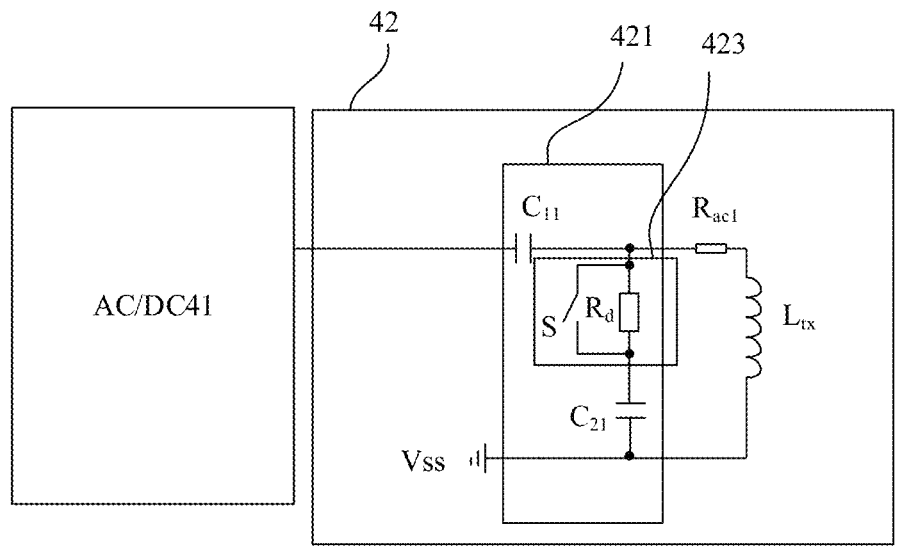
FIG. 5 is a schematic diagram of a structure of a transmitting circuit according to another embodiment of this application.

Based on the foregoing wireless interaction system, improvements in this embodiment of this application mainly lie in the transmitting circuit of the terminal device. An embodiment of this application provides a schematic diagram of a structure of the transmitting circuit of the terminal device. Refer to FIG. 4 and FIG. 5. A transmitting circuit 42 includes a matching network 421 and a transmitting coil 422 connected to the matching network 421. The matching network 421 is configured to perform impedance matching on a received alternating current power signal and send the alternating current power signal to the transmitting coil 422. For example, the alternating current power signal may be output by the transmission conversion unit 102. In FIG. 4 and FIG. 5, an example in which an AC/DC 41 sends the alternating current power signal to the matching network 421 is used for description. The matching network 421 includes a parallel resonant capacitor $C_{21}$ connected in parallel to the transmitting coil 422. The transmitting circuit 42 further includes a resistance switching circuit 423 connected in series to the parallel resonant capacitor $C_{21}$. The resistance switching circuit 423 is configured to adjust a value Q of the transmitting circuit by changing a resistance value of the resistance switching circuit. In the foregoing solution, the transmitting circuit of the terminal device includes the matching network and the transmitting coil connected to the matching network. The matching network is configured to perform impedance matching on the received alternating current power signal and then send the received alternating current power signal to the transmitting coil. The matching network includes the parallel resonant capacitor connected in parallel to the transmitting coil. The transmitting circuit further includes the resistance switching circuit connected in series with the parallel resonant capacitor. The resistance switching circuit is configured to adjust the value Q of the transmitting circuit by changing the resistance value of the resistance switching circuit. In this way, the resistance switching circuit can flexibly control the value Q of the transmitting circuit. When the terminal device performs wireless communication with another terminal device, the transmitting circuit can be switched to a lower value Q, thereby ensuring compatibility with requirements of different communication rates. When the terminal device wirelessly charges another terminal device, the transmitting circuit may be switched to a higher value Q, to reduce a charging loss and improve charging efficiency. In addition, because wireless communication and wireless charging share a group of transmitting coils, device costs are also reduced.

In an embodiment, the resistance switching circuit 423 includes an adjustable resistor. The resistance switching circuit 423 is configured to change a resistance value of the adjustable resistor to adjust the resistance value of the resistance switching circuit. Alternatively the resistance switching circuit 423 includes at least one switch and at least one resistor. The at least one switch and the at least one resistor form a resistance switching network. The resistance switching network is configured to adjust the resistance value of the resistance switching circuit by switching on and off the switch. For example, when the alternating current power signal is used to transmit a communication signal to another terminal device, the resistance switching circuit 423 adjusts the resistance value of the resistance switching circuit to a first resistance value. The first resistance value is added to a branch circuit in which the parallel resonant capacitor $C_{21}$ is located. When the alternating current power signal is used to charge the other terminal device, the resistance switching circuit 423 adjusts the resistance value of the resistance switching circuit to a second resistance value. In this case, the resistance value added to the branch circuit in which the parallel resonant capacitor $C_{21}$ is located is the first resistance value. When the resistance switching circuit 423 adjusts the resistance value of the resistance switching circuit to the first resistance value, the value Q of the transmitting circuit 42 is a first value Q. When the resistance switching circuit 423 adjusts the resistance value of the resistance switching circuit to the second resistance value, the value Q of the transmitting circuit 42 is a second value Q. The first resistance value is greater than the second resistance value, and the first value Q is less than the second value Q. In this way, when the alternating current power signal is used to charge the other terminal device, the value Q of the transmitting circuit needs to be increased, and the resistance switching circuit switches a branch in which the parallel resonant capacitor is located to a smaller second resistance value. When the alternating current power signal is used to transmit the communication signal to the other terminal device, the value Q of the transmitting circuit needs to be reduced. In this case, the resistance switching circuit switches the branch in which the parallel resonant capacitor is located to a larger first resistance value.

In an embodiment, as shown in FIG. 4 and FIG. 5, the matching network 421 and the transmitting coil 422 form a resonant circuit. The matching network 421 includes the resonant circuit, and the resonant circuit includes a series resonant capacitor $C_{11}$ and a parallel resonant capacitor $C_{21}$. A first end of the series resonant capacitor $C_{11}$ is connected to an AC/DC 41, and is configured to receive an alternating current power signal. A second end of the series resonant capacitor $C_{11}$ is connected to the first end of the parallel resonant capacitor $C_{21}$. A second end of the parallel resonant capacitor $C_{21}$ is connected to the ground Vss. The resistance switching circuit 423 is connected in series to the first end or the second end of the parallel resonant capacitor $C_{21}$. The resistance switching circuit 423 in FIG. 4 is connected in series to the second end of the parallel resonant capacitor $C_{21}$. The resistance switching circuit 423 in FIG. 5 is connected in series to the first end of the parallel resonant capacitor $C_{21}$.

Figure 6:
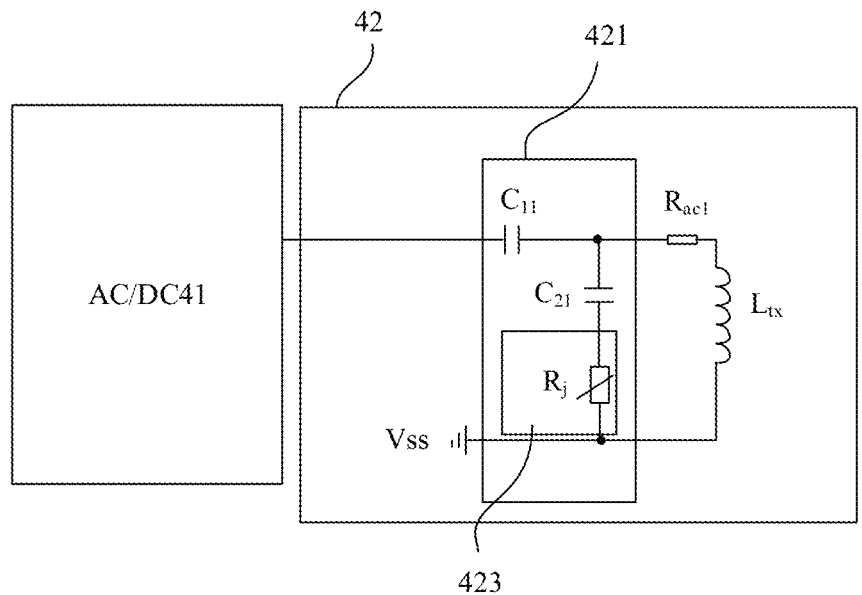
FIG. 6 is a schematic diagram of a structure of a transmitting circuit according to still another embodiment of this application.

Refer to FIG. 4 and FIG. 5. The resistance switching circuit 423 includes a first switch S and a first resistor $R_d$. A first end of the first switch S is connected to a first end of the first resistor $R_d$. A second end of the first switch S is connected to a second end of the first resistor $R_d$. As shown in FIG. 5, the first end of the first switch S is connected to a second end of the series resonant capacitor $C_{11}$. A second end of the first switch S is connected to the first end of the parallel resonant capacitor $C_{21}$. As shown in FIG. 4, the first end of the first switch S is connected to the second end of the parallel resonant capacitor $C_{21}$. The second end of the first switch is connected to the ground Vss. Refer to FIG. 4 and FIG. 5. Alternating current resistance (ACR) of the transmitting coil 422 is $R_{ac1}$, inductance of the transmitting coil is $L_{tx}$, and a value Q of the transmitting coil 422 is $Q=2*\pi*f*L_{tx}/R_{ac1}$. The first switch S may be an electronic or mechanical switch device such as a metal-oxide-semiconductor field-effect transistor (MOSFET, MOS transistor for short), a triode, or a relay. Because the first switch S is connected in series to the $C_{21}$, when the first switch S is short-circuited, a parasitic parameter (on resistance) of the first switch S does not affect the circuit. A value Q of the entire transmitting circuit is $Q1=2*\pi*f*L_{tx}/R_{ac1}$ when the first switch S is short-circuited. The first switch S works in an open-circuited state, and a parasitic capacitance parameter of the first switch S is connected in parallel to the first resistor $R_d$, and then connected in series to a branch circuit of the parallel capacitor $C_{21}$. The value Q of the entire transmitting circuit is $Q2=2*\pi*f*L_{tx}(R_{ac1}+R_d)$ when the first switch S is open-circuited. Q1 is greater than Q2. Therefore, when the first switch S is open-circuited, the value Q is smaller, and the terminal device is used for wireless communication. When the first switch S is short-circuited, the value Q is larger, and the terminal device is used for wireless charging. In addition, a resistance requirement of the first resistor $R_d$ of the $C_{21}$ connected by the first switch S in the open-circuit state is very small (about dozens of ohms), so that a requirement for the value Q of wireless communication can be met. Therefore, a parasitic capacitance parameter introduced by the first switch S is smaller and controllable. In addition, in the example corresponding to FIG. 4, one end of the first switch S is connected to the ground Vss. When the first switch S uses an MOS transistor, a source electrode s of the MOS transistor may be directly connected to the ground Vss. This ensures that the source electrode voltage is fixed, and avoids a floating ground driving problem, which is simple and easy to implement. Alternatively, as shown in FIG. 6, the resistance switching circuit includes an adjustable resistor $R_j$. In this way, ACR connected to the transmitting coil 422 is adjusted by changing a resistance value of the adjustable resistor $R_j$, to implement adjusting the value Q of the transmitting circuit. A principle thereof is similar to that in the foregoing solution, and details are not described again.

Figure 7:
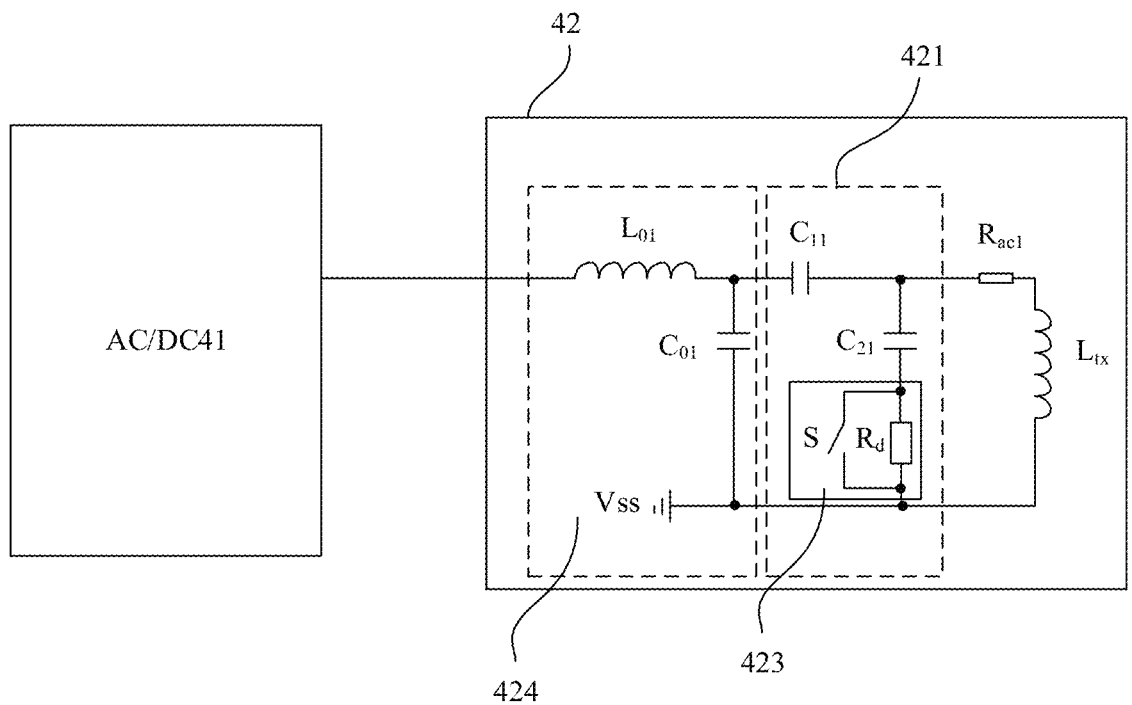
FIG. 7 is a schematic diagram of a structure of a transmitting circuit according to yet another embodiment of this application.

In addition, as shown in FIG. 7, when the terminal device is used for wireless communication, an alternating current power signal output by the AC/DC 41 is usually a high-frequency alternating current signal, and includes a large quantity of high-order harmonic components. To avoid electromagnetic interference caused by a high-order harmonic component, the transmitting circuit 42 further includes a filter circuit 424. The filter circuit 424 is connected between the AC/DC 41 and the matching circuit 421, and is configured to filter an interference signal whose frequency exceeds a threshold frequency in the alternating current power signal. The filter circuit 424 is an inductor-capacitor LC filter circuit. As shown in FIG. 7, the filter circuit 424 includes a filter inductor $L_{01}$ and a filter capacitor $C_{01}$. A first end of the filter inductor $L_{01}$ is connected to the AC/DC 41. A second end of the filter inductor $L_{01}$ is connected to the first end of the filter capacitor $C_{01}$. The second end of the filter capacitor $C_{01}$ is connected to the ground Vss. The first end of the filter capacitor $C_{01}$ is connected to a first end of a series resonant capacitor $C_{11}$.

Figure 8:
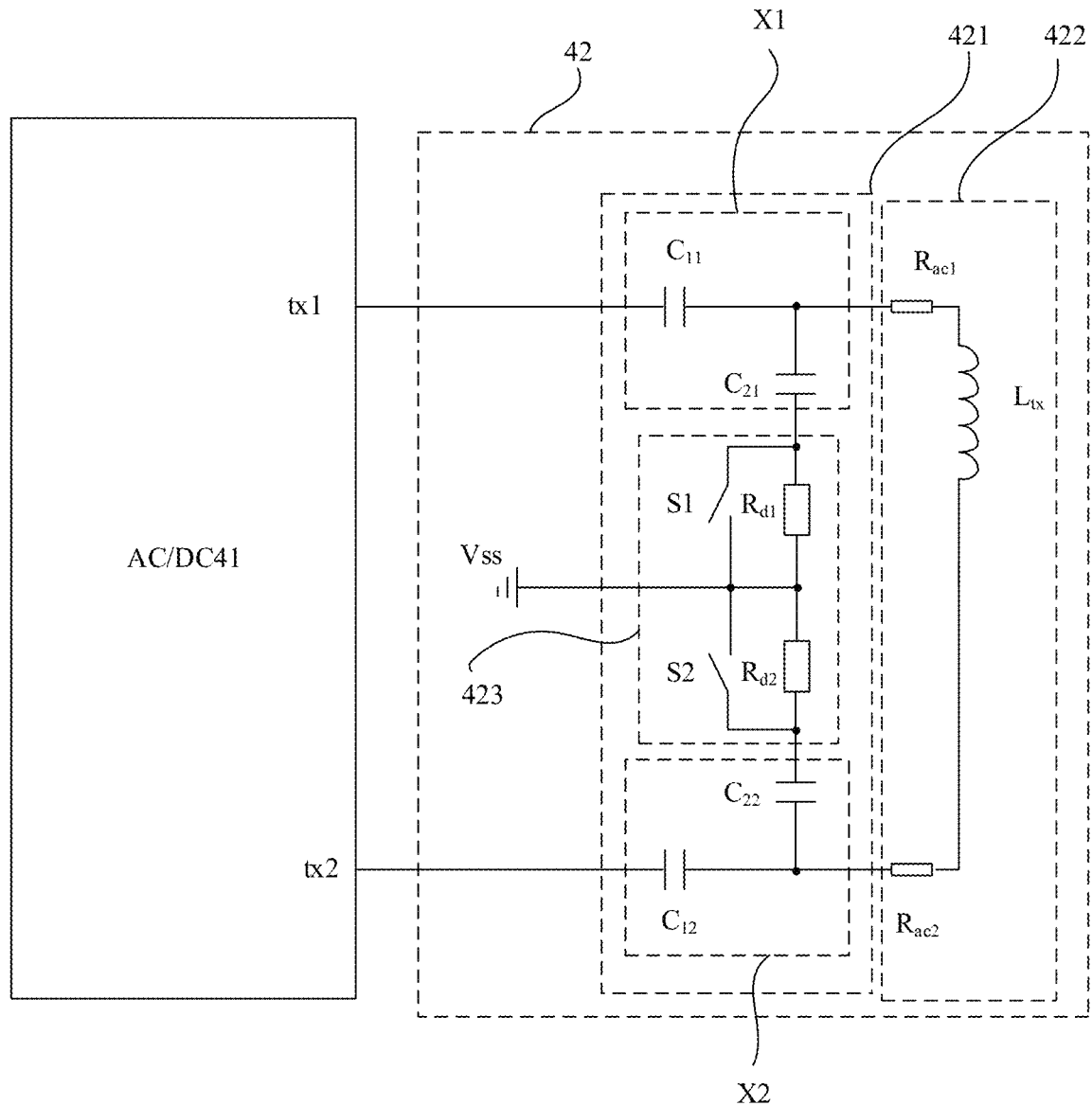
FIG. 8 is a schematic diagram of a structure of a transmitting circuit according to still yet another embodiment of this application.

In addition, as shown in FIG. 8, the matching network 421 includes a first matching circuit X1 and a second matching circuit X2. An input end of the first matching circuit X1 is connected to a first signal output end tx1 of the AC/DC 41. An input end of the second matching circuit X2 is connected to a second signal output end tx2 of the AC/DC 41, and is configured to receive an alternating current power signal output by the AC/DC 41. An input end of the second matching circuit X2 is connected to the second signal output end tx2 of the AC/DC 41. An output end of the first matching circuit X1 is connected to the first end of the transmitting coil 422. An output end of the second matching circuit X2 is connected to the second end of the transmitting coil 422. In an embodiment, as shown in FIG. 8, the first matching circuit X1 includes a first series resonant capacitor $C_{11}$ and a first parallel resonant capacitor $C_{21}$. The second matching circuit X2 includes a second series resonant capacitor $C_{12}$ and a second parallel resonant capacitor $C_{22}$. A first end of the first series resonant capacitor $C_{11}$ is connected to the input end of the first matching circuit X1. A first end of the second series resonant capacitor $C_{12}$ is connected to the input end of the second matching circuit X2, and is configured to receive an alternating current power signal. A second end of the first series resonant capacitor Cu is connected to a first end of the first parallel resonant capacitor $C_{21}$. A second end of the second series resonant capacitor $C_{12}$ is connected to a first end of the second parallel resonant capacitor $C_{22}$. A resistance switching circuit 423 is connected in series between the second end of the first parallel resonant capacitor $C_{21}$ and the second end of the second parallel resonant capacitor $C_{22}$. Refer to the foregoing solution. Because an alternating current is usually used as an alternating current for an alternating current power signal sent by the AC/DC 41, to improve utilization of a power supply, a differential signal may be used as the alternating current power signal. For example, the alternating current power signal includes a first differential signal and a second differential signal. In this way, the AC/DC 41 outputs the first differential signal in the alternating current power signal to the first end of the first series resonant capacitor Cu through the first signal output end tx1. The AC/DC 41 outputs the second differential signal in the alternating current power signal to the first end of the second series resonant capacitor $C_{12}$ through the second signal output end tx2.

The following provides several specific forms of the resistance switching circuit 423.

Refer to FIG. 8. The resistance switching circuit 423 includes a first resistor $R_{d1}$, a second resistor $R_{d2}$, a first switch S1, and a second switch S2. A first end of the first switch S1 is connected to a first end of the first resistor $R_{d1}$. A first end of the second switch S2 is connected to a first end of the second resistor $R_{d2}$. A second end of the first switch S1 is connected to a second end of the second switch S2. A second end of the first resistor $R_{d1}$ is connected to a second end of the second resistor $R_{d2}$. The second end of the second switch S2 is connected to the ground Vss. A second end of the second resistor $R_{d2}$ is connected to the ground Vss. The first end of the first resistor $R_{d1}$ is connected to the second end of the first parallel resonant capacitor $C_{21}$. The first end of the second resistor $R_{d2}$ is connected to the second end of the second parallel resonant capacitor $C_{22}$.

Refer to FIG. 8. ACR of the transmitting coil 422 is $R_{ac1}$ and $R_{ac2}$, inductance of the transmitting coil is $L_{tx}$, and a value Q of the transmitting coil 422 is $Q=2*\pi*f*L_{tx}/(R_{ac1}+R_{ac2})$. The first switch S1 and the second switch S2 may be electronic or mechanical switch components such as MOSFETs, triodes, or relays. Because the first switch S1 is connected in series to the $C_{21}$, and the second switch S2 is connected in series to the $C_{22}$, when the first switch S1 and the second switch S2 are short-circuited, parasitic parameters (on resistance) of the first switch S1 and the second switch S2 do not affect the circuit. A value Q of the entire transmitting circuit is $Q1=2*\pi*f*L_{tx}/(R_{ac1}+R_{ac2})$ when the first switch S1 and the second switch S2 are short-circuited. The first switch S1 and the second switch S2 work in an open-circuited state. A parasitic capacitance parameter of the first switch S1 is connected in parallel to the first resistor $R_{d1}$, and then connected in series to a branch circuit of the first parallel capacitor $C_{21}$. A parasitic capacitance parameter of the second switch S2 is connected in parallel to the second resistor $R_{d2}$, and then connected in series to a branch circuit of the second parallel capacitor $C_{22}$. A value Q of the entire transmitting circuit is $Q2=2*\pi*f*L_{tx}/(R_{ac1}+R_{ac2}\ R_{d1}+R_{d2})$ when the first switch S1 and the second switch S2 are open-circuited. Q1 is greater than Q2. Therefore, when the first switch S1 and the second switch S2 are open-circuited, the value Q is smaller, and the terminal device is used for wireless communication. When the first switch S1 and the second switch S2 are short-circuited, the value Q is larger, and the terminal device is used for wireless charging. In addition, a resistance requirement of the first resistor $R_{d1}$ of the $C_{21}$ connected by the first switch S1 (and a resistance requirement of the second resistor $R_{d2}$ of the $C_{22}$ connected by the second switch S2 in the open-circuited state) in the open-circuit state is very small (about dozens of ohms), so that a requirement for the value Q of wireless communication can be met. Therefore, parasitic capacitance parameters introduced by the first switch S1 and the second switch S2 are smaller and controllable. In addition, in the example corresponding to FIG. 8, one end of the first switch S1 and one end of the second switch S2 are connected to the ground Vss. When an MOS transistor is used, a source electrode s of the MOS transistor may be directly connected to the ground (for example, the first switch S1 may use a P-type MOS transistor, and the second switch S2 may use an N-type MOS transistor). This ensures that a voltage of the source electrode is fixed, and avoids a floating ground driving problem, which is simple and easy to implement.

Figure 9:
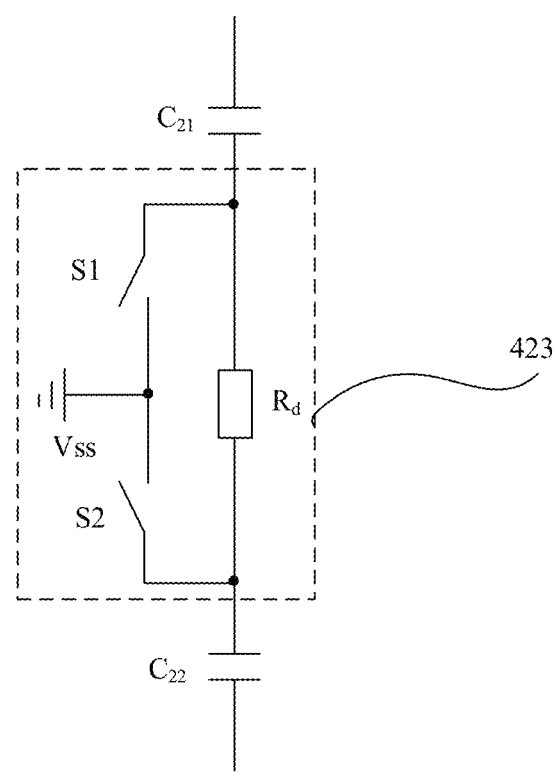
FIG. 9 is a schematic diagram of a structure of a resistance switching circuit according to an embodiment of this application.

Refer to FIG. 9. The resistance switching circuit includes a first resistor $R_d$, a first switch S1, and a second switch S2. A first end of the first switch S1 is connected to a first end of the first resistor $R_d$. A second end of the second switch S2 is connected to a second end of the first resistor $R_d$. A second end of the first switch S1 is connected to the second end of the second switch S2. The second end of the first switch S1 is connected to the ground Vss. The first end of the first resistor $R_d$ is connected to the second end of the first parallel resonant capacitor $C_{21}$. The second end of the first resistor $R_d$ is connected to the second end of the second parallel resonant capacitor $C_{22}$.

Refer to FIG. 8 and FIG. 9, if the resistance switching circuit in FIG. 8 is replaced with the resistance switching circuit shown in FIG. 9, ACR of the transmitting coil 422 is $R_{ac1}$ and $R_{ac2}$, inductance of the transmitting coil is $L_{tx}$, and a value Q of the transmitting coil 422 is Q=$2*\pi*f*L_{tx}/(R_{ac1}+R_{ac2})$. The first switch S1 and the second switch S2 may be electronic or mechanical switch components such as MOSFETs, triodes, or relays. Because the first switch S1 is connected in series to the $C_{21}$, and the second switch S2 is connected in series to the $C_{22}$, when the switch S1 and the second switch S2 are short-circuited, parasitic parameters (on resistance) of the first switch S1 and the second switch S2 do not affect the circuit. A value Q of the entire transmitting circuit is Q1=$2*\pi*f*L_{tx}/(R_{ac1}+R_{ac2})$ when the first switch S1 and the second switch S2 are short-circuited. The first switch S1 and the second switch S2 work in an open-circuited state. A parasitic capacitance parameter of the first switch S1 and a parasitic capacitance parameter of the second switch S2 are connected in series, connected in parallel to the first resistor $R_d$, and then connected in series to a branch circuit of the first parallel resonant capacitor $C_{21}$ and a branch circuit of the second parallel resonant capacitor $C_{22}$. A value Q of the entire transmitting circuit is Q2=$2*\pi*f*L_{tx}/(R_{ac1}+R_{ac2}+R_d)$ when the first switch S1 and the second switch S2 are open-circuited. Q1 is greater than Q2. Therefore, when the first switch S1 and the second switch S2 are open-circuited, the value Q is smaller, and the terminal device is used for wireless communication. When the first switch S1 and the second switch S2 are short-circuited, the value Q is larger, and the terminal device is used for wireless charging. In addition, a resistance requirement of the first resistor $R_d$ of branch circuits of the $C_{21}$ and the $C_{22}$ connected by the first switch S1 and the second switch S2 in the open-circuit state is very small (about dozens of ohms), so that a requirement for the value Q of wireless communication can be met. Therefore, parasitic capacitance parameters introduced by the first switch S1 and the second switch S2 are smaller and controllable. In addition, in the example corresponding to FIG. 9, one end of the first switch S1 and one end of the second switch S2 are connected to the ground Vss. When an MOS transistor is used, a source electrode s of the MOS transistor may be directly connected to the ground (for example, the first switch S1 may use a P-type MOS transistor, and the second switch S2 may use an N-type MOS transistor). This ensures that a voltage of the source electrode is fixed, and avoids a floating ground driving problem, which is simple and easy to implement.

Figure 10:
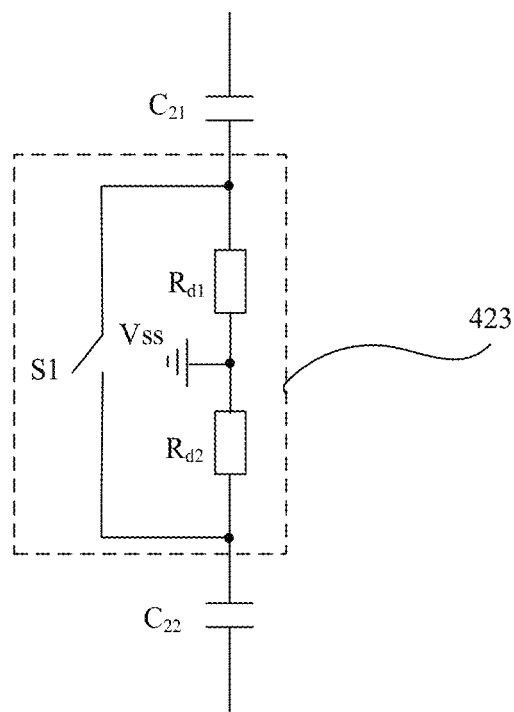
FIG. 10 is a schematic diagram of a structure of a resistance switching circuit according to another embodiment of this application.

Refer to FIG. 10. The resistance switching circuit includes a first switch S1, a first resistor $R_{d1}$, and a second resistor $R_{d2}$. A first end of the first switch S1 is connected to a first end of the first resistor $R_{d1}$. A second end of the first switch S1 is connected to a first end of the second resistor $R_{d2}$. A second end of the first resistor $R_{d1}$ is connected to a second end of the second resistor $R_{d2}$. The second end of the first resistor $R_{d1}$ is connected to the ground Vss. The first end of the first resistor $R_{d1}$ is connected to the second end of the first parallel resonant capacitor $C_{21}$. The first end of the second resistor $R_{d2}$ is connected to the second end of the second parallel resonant capacitor $C_{22}$.

Refer to FIG. 8 and FIG. 10, if the resistance switching circuit in FIG. 8 is replaced with the resistance switching circuit shown in FIG. 10, ACR of the transmitting coil 422 is $R_{ac1}$ and $R_{ac2}$, inductance of the transmitting coil is $L_{tx}$, and a value Q of the transmitting coil 422 is Q=$2*\pi*f*L_{tx}/(R_{ac1}+R_{ac2})$. The first switch S1 may be an electronic or mechanical switch component such as an MOSFET, a triode, or a relay. Because the first switch S1 is connected in series to the $C_{21}$, and the first switch S1 is connected in series to the $C_{22}$, when the switch S1 is short-circuited, a parasitic parameter (on resistance) of the switch S1 does not affect the circuit. A value Q of the entire transmitting circuit is Q1=$2*\pi*f*L_{tx}/(R_{ac1}+R_{ac2})$ when the first switch S1 is short-circuited. The first switch S1 works in an open-circuited state. The first resistor $R_{d1}$ and the second resistor $R_{d2}$ are connected in series, connected in parallel to a parasitic capacitance parameter of the first switch S1, and then connected in series to a branch circuit of the parallel capacitor $C_{21}$ and a branch circuit of the parallel capacitor $C_{22}$. A value Q of the entire transmitting circuit is Q2=$2*\pi*f*L_{tx}/(R_{ac1}+R_{ac2}\ R_{d1}+R_{d2})$ when the first switch S1 is open-circuited. Q1 is greater than Q2. Therefore, when the first switch S1 is open-circuited, the value Q is smaller, and the terminal device is used for wireless communication. When the first switch S1 is short-circuited, the value Q is larger, and the terminal device is used for wireless charging. In addition, a resistance requirement of the first resistor $R_{d1}$ of a branch circuit of the $C_{21}$ and a resistance requirement of the second resistor $R_{d2}$ of a branch circuit of the $C_{22}$ connected by the first switch S1 in the open-circuit state is very small (about dozens of ohms), so that a requirement for the value Q of wireless communication can be met. Therefore, a parasitic capacitance parameter introduced by the first switch S1 is smaller and controllable.

Figure 11:
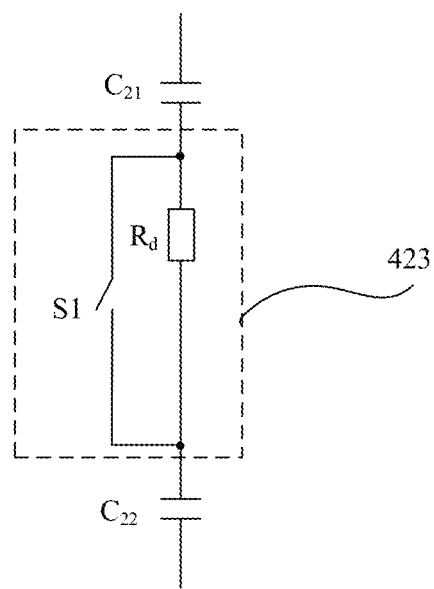
FIG. 11 is a schematic diagram of a structure of a resistance switching circuit according to still another embodiment of this application.

Refer to FIG. 11. The resistance switching circuit includes a first switch S1 and a first resistor $R_d$. A first end of the first switch S1 is connected to a first end of the first resistor $R_d$. A second end of the first switch S1 is connected to a second end of the first resistor $R_d$. The first end of the first resistor $R_d$ is connected to the second end of the first parallel resonant capacitor $C_{21}$. The second end of the first resistor $R_d$ is connected to the second end of the second parallel resonant capacitor $C_{22}$.

Refer to FIG. 8 and FIG. 11, if the resistance switching circuit in FIG. 8 is replaced with the resistance switching circuit shown in FIG. 11, ACR of the transmitting coil 422 is $R_{ac1}$ and $R_{ac2}$, inductance of the transmitting coil is $L_{tx}$, and a value Q of the transmitting coil 422 is Q=$2*\pi*f*L_{tx}/(R_{ac1}+R_{ac2})$. The first switch S1 may be an electronic or mechanical switch component such as an MOSFET, a triode, or a relay. Because the first switch S1 is connected in series to the $C_{21}$, and the first switch S1 is connected in series to the $C_{22}$, when the first switch S1 is short-circuited, a parasitic parameter (on resistance) of the switch S1 does not affect the circuit. A value Q of the entire transmitting circuit is $Q1=2*\pi*f*L_{tx}/(R_{ac1}+R_{ac2})$ when the first switch S1 is short-circuited. The first switch S1 works in an open-circuited state. The first resistor $R_d$ is connected in parallel to a parasitic capacitance parameter of the first switch S1, and then connected in series to a branch circuit of the first parallel resonant capacitor $C_{21}$ and a branch circuit of the second parallel resonant capacitor $C_{22}$. A value Q of the entire transmitting circuit is $Q2=2*\pi*f*L_{tx}/(R_{ac1}+R_{ac2}+R_d)$ when the first switch S1 is open-circuited. Q1 is greater than Q2. Therefore, when the first switch S1 is open-circuited, the value Q is smaller, and the terminal device is used for wireless communication. When the first switch S1 is short-circuited, the value Q is larger, and the terminal device is used for wireless charging. In addition, a resistance requirement of the first resistor $R_d$ of branch circuits of the $C_{21}$ and the $C_{22}$ connected by the first switch S1 in the open-circuit state is very small (about dozens of ohms), so that a requirement for the value Q of wireless communication can be met. Therefore, a parasitic capacitance parameter introduced by the first switch S1 is smaller and controllable.

Figure 12:
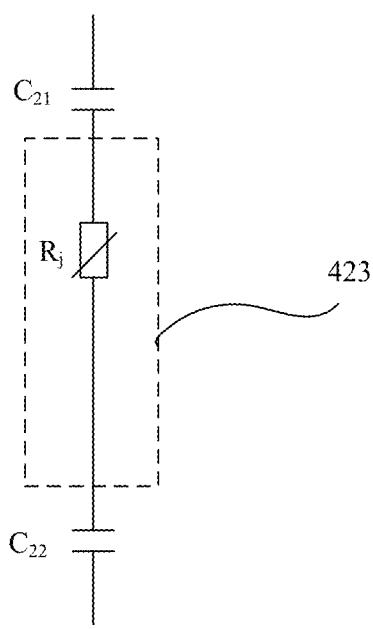
FIG. 12 is a schematic diagram of a structure of a resistance switching circuit according to yet another embodiment of this application.
Figure 13:
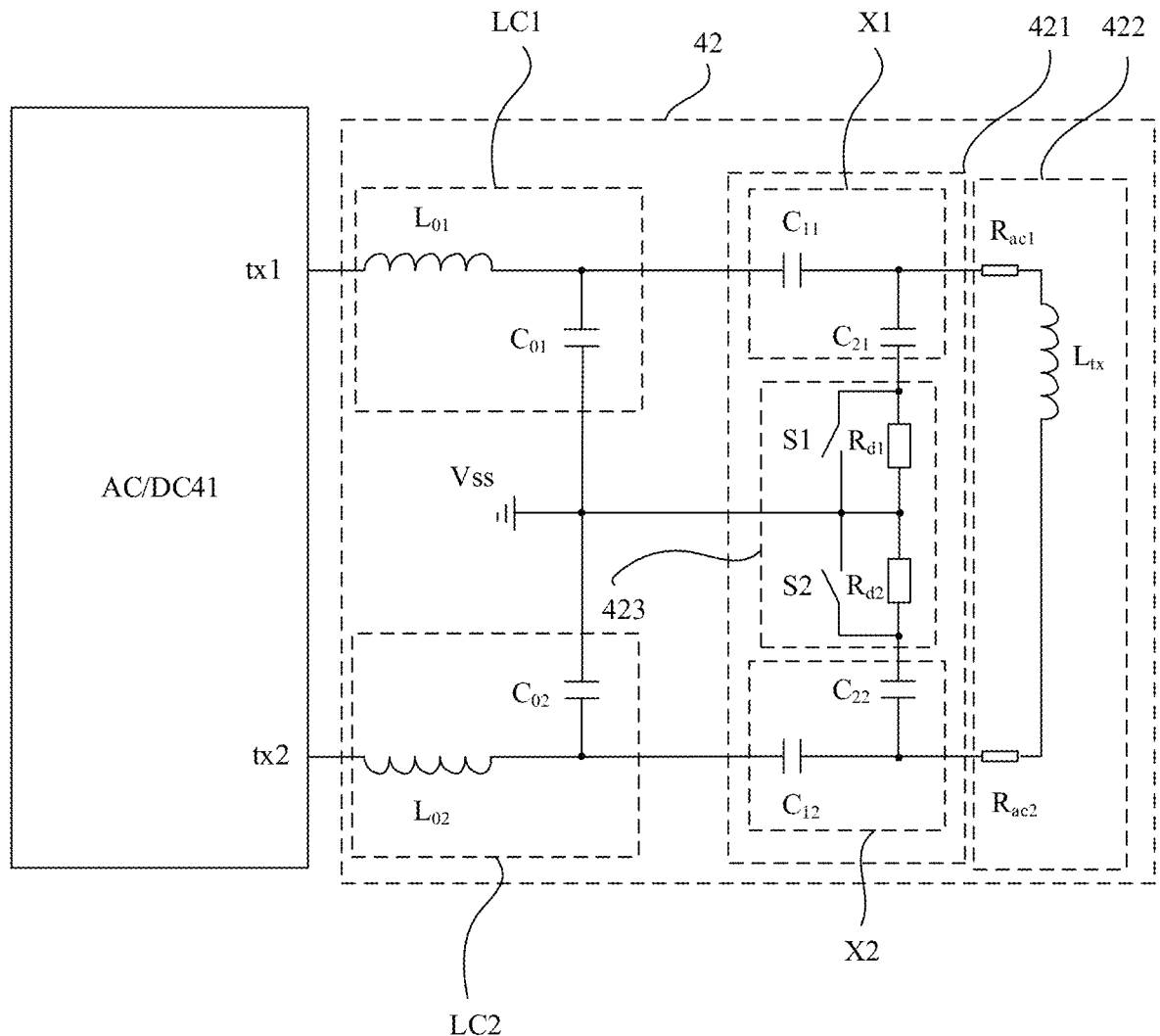
FIG. 13 is a schematic diagram of a structure of a transmitting circuit according to further another embodiment of this application.

Refer to FIG. 12. The resistance switching circuit includes an adjustable resistor $R_j$. Refer to FIG. 8 and FIG. 13, if the resistance switching circuit in FIG. 8 is replaced with the resistance switching circuit shown in FIG. 12, ACR of the transmitting coil 422 is $R_{ac1}$ and $R_{ac2}$, inductance of the transmitting coil is $L_{tx}$, and a value Q of the transmitting coil 422 is $Q=2*\pi*f*L_{tx}/(R_{ac1}+R_{ac2})$. The adjustable resistor $R_j$ is directly connected in series to a branch circuit of the $C_{21}$ and the $C_{22}$. Therefore, a resistance value of the $R_j$ may be directly adjusted. For example, when the terminal device needs to be used for wireless charging, a resistance value of the $R_j$ may be adjusted to a smaller resistance value R1. In this case, a value Q of the entire transmitting circuit is $Q1=2*\pi*f*L_{tx}/(R_{ac1}+R_{ac2}+R_1)$. A resistance value of the terminal device used for wireless communication $R_j$ may be adjusted to a larger resistance value R2. In this case, the value Q of the entire transmitting circuit is $Q2=2*\pi*f*L_{tx}/(R_{ac1}+R_{ac2}+R2)$. Q1 is greater than Q2.

Refer to FIG. 13. The transmitting circuit 42 further includes a first filter circuit LC1. The first filter circuit LC1 is connected between a first signal output end tx1 of a DC/AC41 and an input end of a first matching circuit X1, and is configured to filter an interference signal whose frequency exceeds a threshold frequency in a first differential signal. The transmitting circuit 42 further includes a second filter circuit LC2. The second filter circuit LC2 is connected between a second signal output end tx2 of the DC/AC41 and an input end of a second matching circuit X2, and is configured to filter an interference signal whose frequency exceeds a threshold frequency in a second differential signal. In an embodiment, both the first filter circuit LC1 and the second filter circuit LC2 may use an LC filter circuit. For example, the first filter circuit LC1 includes an inductor $L_{01}$ and a capacitor $C_{01}$, and the second filter circuit LC2 includes an inductor $L_{02}$ and a capacitor $C_{02}$. A first end of the inductor $L_{01}$ is connected to the first signal output end tx1 of the DC/AC41. A second end of the inductor $L_{01}$ is connected to the input end of the first matching circuit X1 (for example, may be connected to a first end of a series resonant capacitor $C_{11}$). The capacitor $C_{01}$ is connected between the second end of the inductor $L_{01}$ and the ground Vss. A first end of the inductor $L_{02}$ is connected to the second signal output end tx2 of the DC/AC41. A second end of the inductor $L_{02}$ is connected to the input end of the second matching circuit X2 (for example, may be connected to a first end of a series resonant capacitor $C_{21}$). The capacitor $C_{02}$ is connected between the second end of the inductor $L_{02}$ and the ground Vss.

Based on the foregoing terminal device, an embodiment of this application further provides an apparatus for controlling a terminal device, configured to control a resistance switching circuit. The apparatus for controlling the terminal device may be a chip or a functional circuit that is separately disposed in the terminal device, or may be a functional entity integrated into a chip in the terminal device. The apparatus for controlling the terminal device is configured to implement a method for controlling the terminal device, and includes the following operations.

101: Control a resistance switching circuit to adjust a value Q of a transmitting circuit by changing a resistance value of the resistance switching circuit.

In an embodiment, operation 101 includes the following operations S1 and S2.

S1: When it is determined that the alternating current power signal is used to charge another terminal device, an apparatus for controlling the terminal device controls the resistance switching circuit to adjust the resistance value of the resistance switching circuit to a second resistance value.

When the resistance switching circuit includes at least one switch and at least one resistor, the at least one switch and the at least one resistor form a resistance switching network. The resistance switching circuit may adjust a state of the switch to adjust the resistance value of the resistance switching circuit to the second resistance value. Refer to FIG. 4 or FIG. 5, when the resistance switching circuit 423 includes the first switch S and the first resistor $R_d$, operation 101 may control the resistance switching circuit to short-circuit the first switch S. Refer to FIG. 6. When the resistance switching circuit 423 includes the adjustable resistor $R_j$, operation 101 may control the adjustable resistor $R_j$ to adjust to a smaller resistance. Refer to FIG. 8. When the resistance switching circuit 423 includes a first resistor $R_{d1}$, a second resistor $R_{d2}$, a first switch S1, and a second switch S2, operation 101 may control the resistance switching circuit to short-circuit the first switch S1 and the second switch S2. Refer to FIG. 9. When the resistance switching circuit includes the first resistor $R_d$, the first switch S1, and the second switch S2, operation 101 may control the resistance switching circuit to short-circuit the first switch S1 and the second switch S2. Refer to FIG. 10. When the resistance switching circuit includes the first switch S1, the first resistor $R_{d1}$, and the second resistor $R_{d2}$, operation 101 may control the resistance switching circuit to short-circuit the first switch S1. Refer to FIG. 11. When the resistance switching circuit includes the first switch S1 and the first resistor $R_d$, operation 101 may control the resistance switching circuit to short-circuit the first switch S1. Refer to FIG. 12. When the resistance switching circuit includes the adjustable resistor, operation 101 may control the resistance switching circuit to adjust the adjustable resistor $R_j$ to a smaller resistance R1.

S2: When it is determined that the alternating current power signal is used to transmit a communication signal to another terminal device, control the resistance switching circuit to adjust the resistance value of the resistance switching circuit to a first resistance value.

When the resistance switching circuit includes at least one switch and at least one resistor, the at least one switch and the at least one resistor form a resistance switching network. The resistance switching circuit may adjust a state of the switch to adjust the resistance value of the resistance switching circuit to the first resistance value. Refer to FIG. 4 or FIG. 5, when the resistance switching circuit 423 includes the first switch S and the first resistor $R_d$, operation 101 may control the resistance switching circuit to open-circuit the first switch S. Refer to FIG. 6. When the resistance switching circuit 423 includes the adjustable resistor $R_j$, operation 101 may control the adjustable resistor $R_j$ to adjust to a larger resistance. Refer to FIG. 8. When the resistance switching circuit 423 includes a first resistor $R_{d1}$, a second resistor $R_{d2}$, a first switch S1, and a second switch S2, operation 101 may control the resistance switching circuit to open-circuit the first switch S1 and the second switch S2. Refer to FIG. 9. When the resistance switching circuit includes the first resistor $R_d$, the first switch S1, and the second switch S2, operation 101 may control the resistance switching circuit to open-circuit the first switch S1 and the second switch S2. Refer to FIG. 10. When the resistance switching circuit includes the first switch S1, the first resistor $R_{d1}$, and the second resistor $R_{d2}$, operation 101 may control the resistance switching circuit to open-circuit the first switch S1. Refer to FIG. 11. When the resistance switching circuit includes the first switch S1 and the first resistor $R_d$, operation 101 may control the resistance switching circuit to open-circuit the first switch S1. Refer to FIG. 12. When the resistance switching circuit includes the adjustable resistor, operation 101 may control the resistance switching circuit to adjust the adjustable resistor $R_j$ to a larger resistance R2.

When the resistance switching circuit adjusts the resistance value of the resistance switching circuit to the first resistance value, the value Q of the transmitting circuit is the first value Q. When the resistance switching circuit adjusts the resistance value of the resistance switching circuit to the second resistance value, the value Q of the transmitting circuit is the second value Q. The first resistance value is greater than the second resistance value, and the first value Q is less than the second value Q.

Before operation S1, a type of the other terminal device needs to be determined. It is determined, based on the type of the other terminal device, that the alternating current power signal is used to charge the other terminal device, or that the alternating current power signal is used to transmit the communication signal to the other terminal device. Certainly, the apparatus for controlling the terminal device may determine a type of the other terminal device according to a communication protocol sent by the other terminal. The apparatus for controlling the terminal device may receive the communication protocol in a wireless communication manner, for example, Bluetooth, wireless broadband, ZigBee protocol, RFID, or a remote wireless technology. Certainly, the type of the other terminal device may also be determined by using the communication protocol received by the terminal device provided in this embodiment of this application. Certainly, in this case, the terminal device needs to be controlled to work in a wireless communication mode. In other words, the resistance switching circuit is controlled to adjust the resistance value of the resistance switching circuit to the first resistance value. Because the type of the other terminal device needs to be first determined before operation S1, a default working status of the terminal device is the wireless communication mode. In other words, when it is determined that the other terminal device needs to be charged, the terminal device switches to a wireless charging mode.

Figure 14:
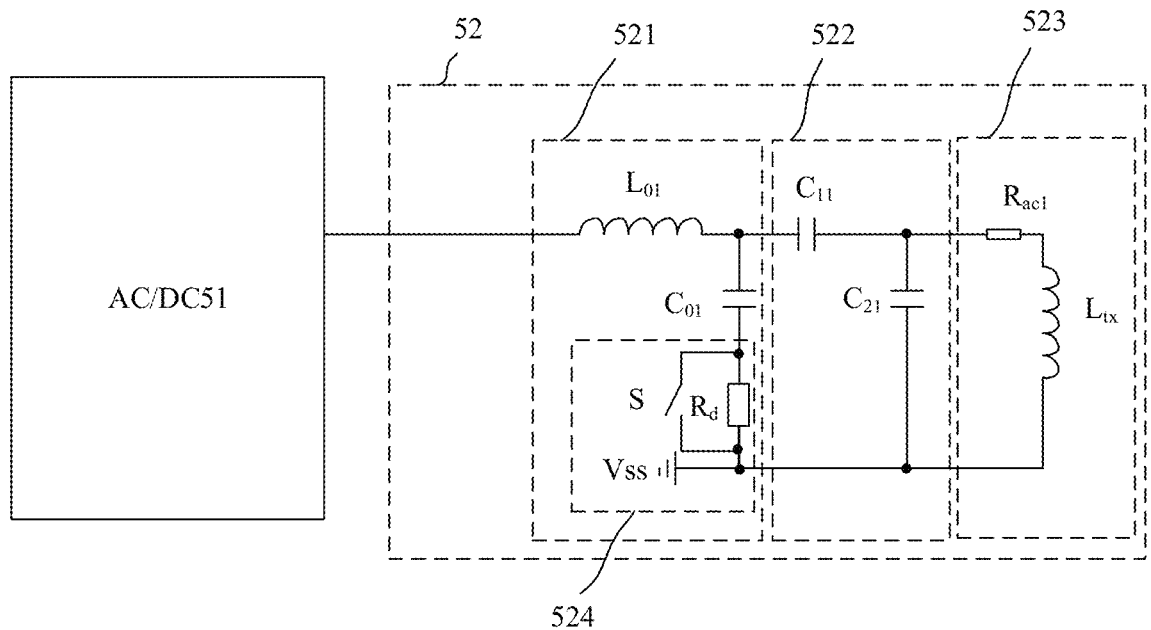
FIG. 14 is a schematic diagram of a structure of a transmitting circuit according to further another embodiment of this application.
Figure 15:
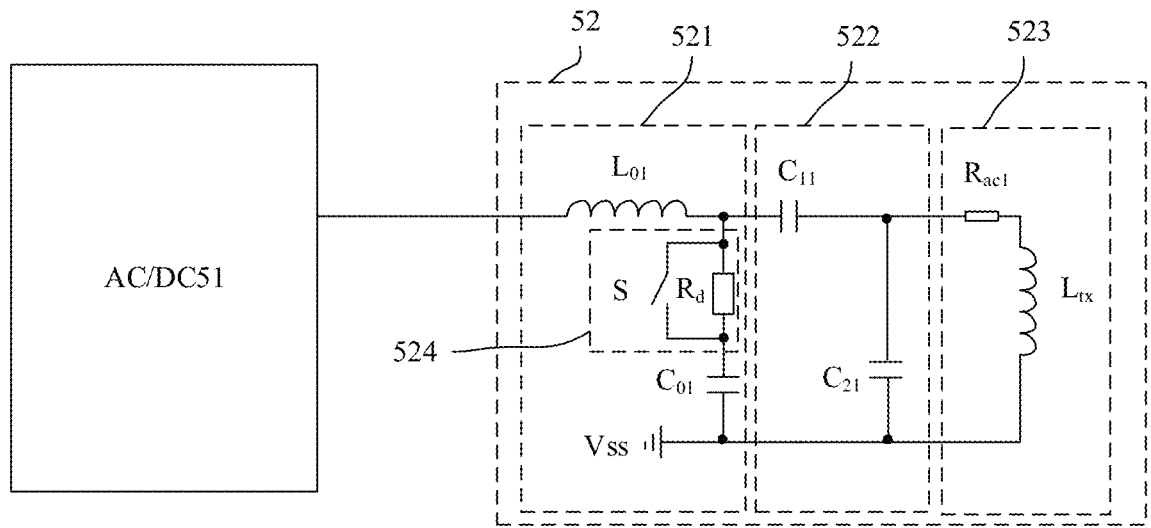
FIG. 15 is a schematic diagram of a structure of a transmitting circuit according to further another embodiment of this application.

Based on the foregoing wireless charging system, an embodiment of this application provides a schematic diagram of a structure of a transmitting circuit. Refer to FIG. 14 and FIG. 15. A transmitting circuit 52 includes a filter circuit 521, a matching network 522 connected to the filter circuit 521, and a transmitting coil 523 connected to the matching network 522. The filter circuit 521 is configured to filter a received alternating current power signal. The matching network 522 is configured to perform impedance matching on the filtered alternating current power signal, and then send the filtered alternating current power signal to the transmitting coil 523. For example, the alternating current power signal may be output by a transmission conversion unit 102. FIG. 14 and FIG. 15 show an example in which an AC/DC 51 sends the alternating current power signal to the filter circuit 521. The filter circuit 521 uses an inductor-capacitor LC filter circuit, and the filter circuit includes a filter capacitor $C_{01}$. The transmitting circuit 52 further includes a resistance switching circuit 524 connected in series to the filter capacitor $C_{01}$. The resistance switching circuit 524 is configured to adjust a value Q of the transmitting circuit 52 by changing a resistance value of the resistance switching circuit. In the foregoing solution, the transmitting circuit of the terminal device includes the filter circuit, the matching network, and the transmitting coil. The filter circuit is connected to the transmitting chip. The matching network is separately connected to the filter circuit and the transmitting coil. The filter circuit is configured to filter the received alternating current power signal. The matching network is configured to perform impedance matching on the filtered alternating current power signal and send the filtered alternating current power signal to the transmitting coil. The filter circuit uses the inductor-capacitor LC filter circuit. The filter circuit includes a filter capacitor $C_{01}$. The transmitting circuit further includes the resistance switching circuit connected in series to the filter capacitor $C_{01}$. The resistance switching circuit is configured to adjust the value Q of the transmitting circuit by changing the resistance value of the resistance switching circuit. In this way, the resistance switching circuit can flexibly control the value Q of the transmitting circuit. When the terminal device performs wireless communication with another terminal device, the transmitting circuit can be switched to a lower value Q, thereby ensuring compatibility with requirements of different communication rates. When the terminal device wirelessly charges another terminal device, the transmitting circuit may be switched to a higher value Q, to reduce a charging loss and improve charging efficiency. In addition, because wireless communication and wireless charging share a group of transmitting coils, device costs are also reduced.

The resistance switching circuit 423 includes an adjustable resistor. The resistance switching circuit 423 is configured to change a resistance value of the adjustable resistor to adjust the resistance value of the resistance switching circuit. Alternatively the resistance switching circuit 423 includes at least one switch and at least one resistor. The at least one switch and the at least one resistor form a resistance switching network. The resistance switching network is configured to adjust the resistance value of the resistance switching circuit by switching on and off the switch. In an embodiment, when the alternating current power signal is used to transmit a communication signal to another terminal device, the resistance switching circuit 524 adjusts the resistance value of the resistance switching circuit to a first resistance value. In other words, the first resistance value is added to a branch circuit in which the filter capacitor $C_{01}$ is located. When the alternating current power signal is used to charge the other terminal device, the resistance switching circuit 524 adjusts the resistance value of the resistance switching circuit to a second resistance value. In other words, the resistance value added to the branch circuit in which the filter capacitor $C_{01}$ is located is adjusted to the second resistance value. When the resistance switching circuit 524 adjusts the resistance value of the resistance switching circuit to the first resistance value, the value Q of the transmitting circuit 52 is a first value Q. When the resistance switching circuit 524 adjusts the resistance value of the resistance switching circuit to the second resistance value, the value Q of the transmitting circuit 52 is a second value Q. The first resistance value is greater than the second resistance value, and the first value Q is less than the second value Q. In this way, when the alternating current power signal is used to charge the other terminal device, the value Q of the transmitting circuit needs to be increased, and the resistance switching circuit 524 adjusts the resistance value of the resistance switching circuit to a smaller second resistance value. When the alternating current power signal is used to transmit a communication signal to the other terminal device, the value Q of the transmitting circuit needs to be reduced. In this case, the resistance switching circuit 524 adjusts the resistance value of the resistance switching circuit to a larger first resistance value.

Refer to FIG. 14 and FIG. 15. The filter circuit 521 includes a filter inductor $L_{01}$ and a filter capacitor $C_{01}$. A first end of the filter inductor $L_{01}$ is connected to the AC/DC51, and is configured to receive the alternating current power signal sent by the AC/DC51. A second end of the filter inductor L01 is connected to the first end of the filter capacitor $C_{01}$. A second end of the filter capacitor $C_{01}$ is connected to the ground Vss. The second end of the filter inductor $L_{01}$ is connected to the matching network 522. The resistance switching circuit 524 is connected in series to the first end or the second end of the filter capacitor $C_{01}$.

Refer to FIG. 14 and FIG. 15. The resistance switching circuit 524 includes a first switch S and a first resistor $R_d$. A first end of the first switch S is connected to a first end of the first resistor $R_d$. A second end of the first switch S is connected to a second end of the first resistor $R_d$. As shown in FIG. 14, a first end of a first switch S is connected to the second end of a filter capacitor $C_{01}$. A second end of the first switch S is connected to the ground Vss. As shown in FIG. 15, the first end of the first switch S is connected to the second end of the filter inductor $L_{01}$. The second end of the first switch S is connected to the first end of the filter capacitor $C_{01}$. Refer to FIG. 14 and FIG. 15. ACR of the transmitting coil 523 is $R_{ac1}$, inductance of the transmitting coil is Lt, and a value Q of the transmitting coil 523 is $Q=2*\pi*f*L_{tx} R_{ac1}$. The first switch S may be an electronic or mechanical switch component such as an MOSFET, a triode, or a relay. Because the first switch S is connected in series to the $C_{01}$, when the first switch S is short-circuited, a parasitic parameter (on resistance) of the first switch S does not affect the circuit. A value Q of the entire transmitting circuit is $Q1=2*n*f*L_{tx}/R_{ac1}$ when the first switch S is short-circuited. The first switch S works in an open-circuited state, and a parasitic capacitance parameter of the first switch S is connected in parallel to the first resistor $R_d$, and then connected in series to a branch circuit of the filter capacitor $C_{01}$. The value Q of the entire transmitting circuit is $Q2=2*\pi*f*Lt/(R_{ac1}+R_d)$ when the first switch S is open-circuited. Q1 is greater than Q2. Therefore, when the first switch S is open-circuited, the value Q is smaller, and the terminal device is used for wireless communication. When the first switch S is short-circuited, the value Q is larger, and the terminal device is used for wireless charging. In addition, a resistance requirement of the first resistor $R_d$ of the $C_{01}$ connected by the first switch S in the open-circuit state is very small (about dozens of ohms), so that a requirement for the value Q of wireless communication can be met. Therefore, a parasitic capacitance parameter introduced by the first switch S is smaller and controllable. In addition, in the example corresponding to FIG. 14, one end of the switch S is connected to the ground Vss. When an MOS transistor is used, a source electrode s of the MOS transistor may be directly connected to the ground. This ensures that the source electrode voltage is fixed, and avoids a floating ground driving problem, which is simple and easy to implement. Alternatively, the resistance switching circuit 524 includes an adjustable resistor. In this way, ACR connected to the transmitting coil 423 is adjusted by changing a resistance value of the adjustable resistor, to implement adjusting the value Q of the transmitting circuit. A principle thereof is similar to that in the foregoing solution, and details are not described again.

In addition, as shown in FIG. 14 and FIG. 15, the matching network 522 includes the series resonant capacitor $C_{11}$ and the parallel resonant capacitor $C_{21}$. The first end of the series resonant capacitor $C_{11}$ is connected to the filter circuit 521. The second end of the series resonant capacitor $C_{11}$ is connected to the first end of the transmitting coil 523. The second end of the series resonant capacitor $C_{11}$ is connected to the first end of the parallel resonant capacitor $C_{21}$. The second end of the parallel resonant capacitor $C_{21}$ is connected to the ground Vss.

Figure 16:
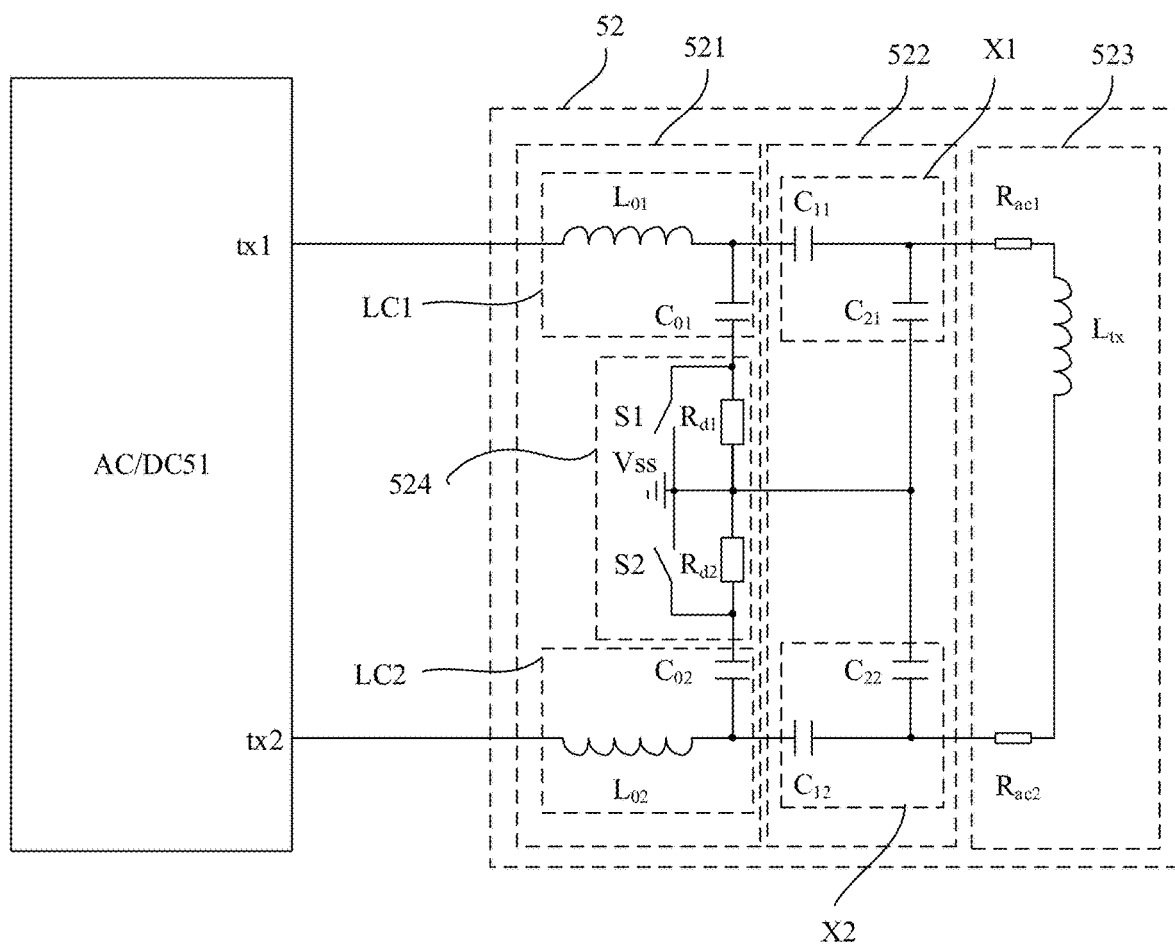
FIG. 16 is a schematic diagram of a structure of a transmitting circuit according to further another embodiment of this application.

In addition, as shown in FIG. 16, the filter circuit 521 includes a first filter circuit LC1 and a second LC filter circuit LC2. An input end of the first filter circuit LC1 is connected to the first signal output end tx1 of the AC/DC51. An input end of the second filter circuit LC2 is connected to the second signal output end tx2 of the AC/DC51, to receive the alternating current power signal output by the AC/DC51. An output end of the first LC filter circuit LC1 is connected to the matching network 522. An output end of the second filter circuit LC2 is connected to the matching network 522. For example, as shown in FIG. 16, the first filter circuit LC1 includes a first filter inductor $L_{01}$ and a first filter capacitor $C_{01}$. The second filter circuit LC2 includes a second filter inductor $L_{02}$ and a second filter capacitor $C_{02}$. A first end of the first filter inductor $L_{01}$ is connected to an input end of the first filter circuit LC1. A first end of the second filter inductor $L_{02}$ is connected to an input end of the second filter circuit LC2, and is configured to receive the alternating current power signal output by the AC/DC51. A second end of the first filter inductor $L_{01}$ is connected to a first end of the first filter capacitor $C_{01}$. The second end of the first filter inductor $L_{01}$ is connected to the output end of the first filter circuit LC1. A second end of the second filter inductor $L_{02}$ is connected to the first end of the second filter capacitor $C_{02}$. The second end of the second filter inductor $L_{02}$ is connected to an output end of the second LC filter circuit LC2. A resistance switching circuit 524 is connected in series between the second end of the first filter capacitor $C_{01}$ and the second end of the second filter capacitor $C_{02}$. Refer to the foregoing solution. Because an alternating current is usually used as an alternating current for an alternating current power signal sent by the AC/DC51, to improve utilization of a power supply, a differential signal may be used as the alternating current power signal. For example, the alternating current power signal includes a first differential signal and a second differential signal. In this way, the AC/DC51 outputs the first differential signal in the alternating current power signal to the first end of the first filter inductor $L_{01}$ through the first signal output end tx1. The AC/DC51 outputs the second differential signal of the alternating current power signal to the first end of the second filter inductor $L_{02}$ through the second signal output end tx2.

The following provides several specific forms of the resistance switching circuit.

Refer to FIG. 16. The resistance switching circuit 524 includes a first resistor $R_{d1}$, a second resistor $R_{d2}$, a first switch S1, and a second switch S2. A first end of the first switch S1 is connected to a first end of the first resistor $R_{d1}$. A first end of the second switch S2 is connected to a first end of the second resistor $R_{d2}$. A second end of the first switch S1 is connected to a second end of the second switch S2. A second end of the first resistor $R_{d1}$ is connected to a second end of the second resistor $R_{d2}$. The second end of the second switch S2 is connected to the ground Vss. A second end of the second resistor $R_{d2}$ is connected to the ground Vss. The first end of the first resistor $R_{d1}$ is connected to the second end of the first filter capacitor $C_{01}$. The first end of the second resistor $R_{d2}$ is connected to the second end of the second filter capacitor $C_{02}$.

Refer to FIG. 16. ACR of the transmitting coil 523 is $R_{ac1}$ and $R_{ac2}$, inductance of the transmitting coil is $L_{tx}$, and a value Q of the transmitting coil 523 is $Q=2*\pi*f*L_{tx}/(R_{ac1}+R_{ac2})$. The first switch S1 and the second switch S2 may be electronic or mechanical switch components such as MOSFETs, triodes, or relays. Because the first switch S1 is connected in series to the $C_{01}$, and the second switch S2 is connected in series to the $C_{02}$, when the first switch S1 and the second switch S2 are short-circuited, parasitic parameters (on resistance) of the first switch S1 and the second switch S2 do not affect the circuit. A value Q of the entire transmitting circuit is $Q1=2*\pi*f*L_{tx}/(R_{ac1}+R_{ac2})$ when the first switch S1 and the second switch S2 are short-circuited. The first switch S1 and the second switch S2 work in an open-circuited state. A parasitic capacitance parameter of the first switch S1 is connected in parallel to the first resistor $R_{d1}$, and then connected in series to a branch circuit of the first filter capacitor $C_{01}$. A parasitic capacitance parameter of the second switch S2 is connected in parallel to the second resistor $R_{d2}$, and then connected in series to a branch circuit of the second filter capacitor $C_{02}$. A value Q of the entire transmitting circuit is $Q2=2*\pi*f*L_{tx}/(R_{ac1}+R_{ac2}+R_{d1}+R_{d2})$ when the first switch S1 and the second switch S2 are open-circuited. Q1 is greater than Q2. Therefore, when the first switch S1 and the second switch S2 are open-circuited, the value Q is smaller, and the terminal device is used for wireless communication. When the first switch S1 and the second switch S2 are short-circuited, the value Q is larger, and the terminal device is used for wireless charging. In addition, a resistance requirement of the first resistor $R_{d1}$ of the $C_{01}$ connected by the first switch S1 (and a resistance requirement of the second resistor $R_{d2}$ of the Coz connected by the second switch S2 in the open-circuited state) in the open-circuit state is very small (about dozens of ohms), so that a requirement for the value Q of wireless communication can be met. Therefore, parasitic capacitance parameters introduced by the first switch S1 and the second switch S2 are smaller and controllable. In addition, in the example corresponding to FIG. 16, one end of the first switch S1 and one end of the second switch S2 are connected to the ground Vss. When an MOS transistor is used, a source electrode s of the MOS transistor may be directly connected to the ground (for example, the first switch S1 may use a P-type MOS transistor, and the second switch S2 may use an N-type MOS transistor). This ensures that a voltage of the source electrode is fixed, and avoids a floating ground driving problem, which is simple and easy to implement.

Figure 17:
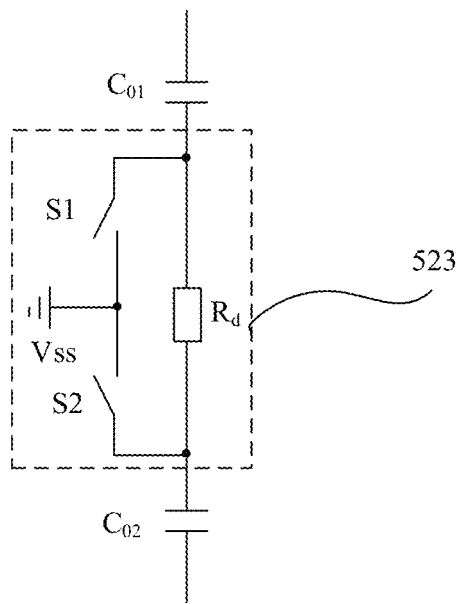
FIG. 17 is a schematic diagram of a structure of a resistance switching circuit according to still yet another embodiment of this application.

Refer to FIG. 17. The resistance switching circuit includes a first resistor $R_d$, a first switch S1, and a second switch S2. A first end of the first switch S1 is connected to a first end of the first resistor $R_d$. A second end of the second switch S2 is connected to a second end of the first resistor $R_d$. A second end of the first switch S1 is connected to the second end of the second switch S2. The second end of the first switch S1 is connected to the ground Vss. The first end of the first resistor $R_d$ is connected to the second end of the first filter capacitor $C_{01}$. The second end of the first resistor $R_d$ is connected to the second end of the second filter capacitor $C_{02}$.

Refer to FIG. 16 and FIG. 17, if the resistance switching circuit in FIG. 16 is replaced with the resistance switching circuit shown in FIG. 17, ACR of the transmitting coil 523 is $R_{ac1}$ and $R_{ac2}$, inductance of the transmitting coil is $L_{tx}$, and a value Q of the transmitting coil 523 is $Q=2*\pi*f*L_{tx}/(R_{ac1}+R_{ac2})$. The first switch S1 and the second switch S2 may be electronic or mechanical switch components such as MOSFETs, triodes, or relays. Because the first switch S1 is connected in series to the $C_{01}$, and the second switch S2 is connected in series to the Coz, when the first switch S1 and the second switch S2 are short-circuited, parasitic parameters (on resistance) of the first switch S1 and the second switch S2 do not affect the circuit. A value Q of the entire transmitting circuit is $Q1=2*\pi*f*L_{tx}/(R_{ac1}+R_{ac2})$ when the first switch S1 and the second switch S2 are short-circuited. The first switch S1 and the second switch S2 work in an open-circuited state. A parasitic capacitance parameter of the first switch S1 and a parasitic capacitance parameter of the second switch S2 are connected in series, connected in parallel to the first resistor $R_d$, and then connected in series to a branch circuit of the first filter capacitor $C_{01}$ and a branch circuit of the second filter capacitor $C_{02}$. A value Q of the entire transmitting circuit is $Q2=2*\pi*f*L_{tx}/(R_{ac1}+R_{ac2}+R_d)$ when the first switch S1 and the second switch S2 are open-circuited. Q1 is greater than Q2. Therefore, when the first switch S1 and the second switch S2 are open-circuited, the value Q is smaller, and the terminal device is used for wireless communication. When the first switch S1 and the second switch S2 are short-circuited, the value Q is larger, and the terminal device is used for wireless charging. In addition, a resistance requirement of the first resistor $R_d$ of branch circuits of the $C_{01}$ and the Coz connected by the first switch S1 and the second switch S2 in the open-circuit state is very small (about dozens of ohms), so that a requirement for the value Q of wireless communication can be met. Therefore, parasitic capacitance parameters introduced by the first switch S1 and the second switch S2 are smaller and controllable. In addition, in the example corresponding to FIG. 17, one end of the first switch S1 and one end of the second switch S2 are connected to the ground Vss. When an MOS transistor is used, a source electrode s of the MOS transistor may be directly connected to the ground (for example, the first switch S1 may use a P-type MOS transistor, and the second switch S2 may use an N-type MOS transistor). This ensures that a voltage of the source electrode is fixed, and avoids a floating ground driving problem, which is simple and easy to implement.

Figure 18:
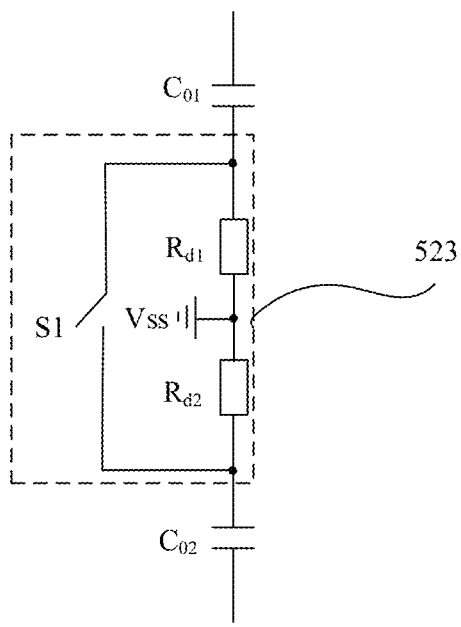
FIG. 18 is a schematic diagram of a structure of a resistance switching circuit according to further another embodiment of this application.

Refer to FIG. 18. The resistance switching circuit includes a first switch S1, a first resistor $R_{d1}$, and a second resistor $R_{d2}$. A first end of the first switch S1 is connected to a first end of the first resistor $R_{d1}$. A second end of the first switch S1 is connected to a first end of the second resistor $R_{d2}$. A second end of the first resistor $R_{d1}$ is connected to a second end of the second resistor $R_{d2}$. The second end of the first resistor $R_{d1}$ is connected to the ground Vss. The first end of the first resistor $R_{d1}$ is connected to the second end of the first filter capacitor $C_{01}$. The first end of the second resistor $R_{d2}$ is connected to the second end of the second filter capacitor $C_{02}$.

Refer to FIG. 16 and FIG. 18, if the resistance switching circuit in FIG. 16 is replaced with the resistance switching circuit shown in FIG. 18, ACR of the transmitting coil 523 is $R_{ac1}$ and $R_{ac2}$, inductance of the transmitting coil is $L_{tx}$, and a value Q of the transmitting coil 523 is $Q=2*\pi*f*L_{tx}/(R_{ac1}+R_{ac2})$. The first switch S1 may be an electronic or mechanical switch component such as an MOSFET, a triode, or a relay. Because the first switch S1 is connected in series to the $C_{01}$, and the first switch S1 is connected in series to the Coz, when the switch S1 is short-circuited, a parasitic parameter (on resistance) of the switch S1 does not affect the circuit. A value Q of the entire transmitting circuit is $Q1=2*\pi*f*L_{tx}/(R_{ac1}+R_{ac2})$ when the first switch S1 is short-circuited. The first switch S1 works in an open-circuited state. The first resistor $R_{d1}$ and the second resistor $R_{d2}$ are connected in series, connected in parallel to a parasitic capacitance parameter of the first switch S1, and then connected in series to a branch circuit of the first filter capacitor $C_{01}$ and a branch circuit of the second filter capacitor $C_{02}$. A value Q of the entire transmitting circuit is $Q2=2*\pi*f*L_{tx}/(R_{ac1}+R_{ac2}\ R_{d1}+R_{d2})$ when the first switch S1 is open-circuited. Q1 is greater than Q2. Therefore, when the first switch S1 is open-circuited, the value Q is smaller, and the terminal device is used for wireless communication. When the first switch S1 is short-circuited, the value Q is larger, and the terminal device is used for wireless charging. In addition, a resistance requirement of the first resistor $R_{d1}$ of a branch circuit of the $C_{01}$ and a resistance requirement of the second resistor $R_{d2}$ of a branch circuit of the Coz connected by the first switch S1 in the open-circuit state is very small (about dozens of ohms), so that a requirement for the value Q of wireless communication can be met. Therefore, a parasitic capacitance parameter introduced by the first switch S1 is smaller and controllable.

Figure 19:
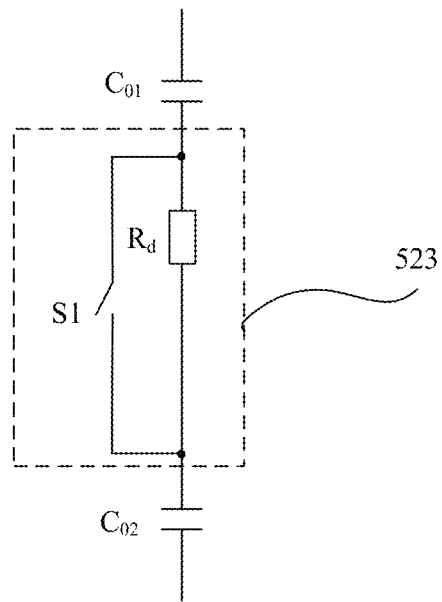
FIG. 19 is a schematic diagram of a structure of a resistance switching circuit according to further another embodiment of this application.

Refer to FIG. 19. The resistance switching circuit includes a first switch S1 and a first resistor $R_d$. A first end of the first switch S1 is connected to a first end of the first resistor $R_d$. A second end of the first switch S1 is connected to a second end of the first resistor $R_d$. The first end of the first resistor $R_d$ is connected to the second end of the first filter capacitor $C_{01}$. The second end of the first resistor $R_d$ is connected to the second end of the second filter capacitor $C_{02}$.

Refer to FIG. 16 and FIG. 19, if the resistance switching circuit in FIG. 16 is replaced with the resistance switching circuit shown in FIG. 19, ACR of the transmitting coil 523 is $R_{ac1}$ and $R_{ac2}$, inductance of the transmitting coil is $L_{tx}$, and a value Q of the transmitting coil 523 is $Q=2*\pi*f*L_{tx}/(R_{ac1}+R_{ac2})$. The first switch S1 may be an electronic or mechanical switch component such as an MOSFET, a triode, or a relay. Because the first switch S1 is connected in series to the $C_{01}$, and the first switch S1 is connected in series to the Coz, when the first switch S1 is short-circuited, a parasitic parameter (on resistance) of the switch S1 does not affect the circuit. A value Q of the entire transmitting circuit is $Q1=2*\pi*f*L_{tx}/(R_{ac1}+R_{ac2})$ when the first switch S1 is short-circuited. The first switch S1 works in an open-circuited state. The first resistor $R_d$ is connected in parallel to a parasitic capacitance parameter of the first switch S1, and then connected in series to a branch circuit of the first filter capacitor $C_{01}$ and a branch circuit of the second filter capacitor $C_{02}$. A value Q of the entire transmitting circuit is $Q2=2*\pi*f*L_{tx}/(R_{ac1}\ R_{ac2}+R_d)$ when the first switch S1 is open-circuited. Q1 is greater than Q2. Therefore, when the first switch S1 is open-circuited, the value Q is smaller, and the terminal device is used for wireless communication. When the first switch S1 is short-circuited, the value Q is larger, and the terminal device is used for wireless charging. In addition, a resistance requirement of the first resistor $R_d$ of branch circuits of the $C_{01}$ and the Coz connected by the first switch S1 in the open-circuit state is very small (about dozens of ohms), so that a requirement for the value Q of wireless communication can be met. Therefore, a parasitic capacitance parameter introduced by the first switch S1 is smaller and controllable.

Figure 20:
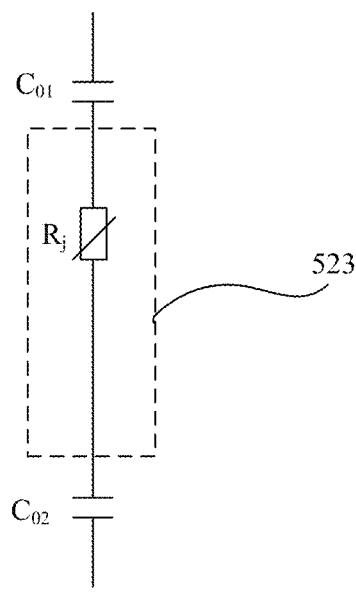
FIG. 20 is a schematic diagram of a structure of a resistance switching circuit according to further another embodiment of this application.

Refer to FIG. 20. The resistance switching circuit includes an adjustable resistor. Refer to FIG. 16 and FIG. 20, if the resistance switching circuit in FIG. 16 is replaced with the resistance switching circuit shown in FIG. 20, ACR of the transmitting coil 523 is $R_{ac1}$ and $R_{ac2}$, inductance of the transmitting coil is $L_{tx}$, and a value Q of the transmitting coil 422 is $Q=2*\pi*f*L_{tx}/(R_{ac1}\ R_{ac2})$. The adjustable resistor $R_j$ is directly connected in series to a branch circuit of the $C_{01}$ and the Coz. Therefore, a resistance value of the $R_j$ may be directly adjusted. For example, when the terminal device needs to be used for wireless charging, a resistance value of the $R_j$ may be adjusted to a smaller resistance value R1. In this case, a value Q of the entire transmitting circuit is $Q1=2*\pi*f*L_{tx}/(R_{ac1}+R_{ac2}+R1)$. A resistance value of the terminal device used for wireless communication $R_j$ may be adjusted to a larger resistance value R2. In this case, the value Q of the entire transmitting circuit is $Q2=2*\pi*f*L_{tx}/(R_{ac1}+R_{ac2}+R2)$. Q1 is greater than Q2.

As shown in FIG. 16, the matching network 522 includes a first matching circuit X1 and a second matching circuit X2. An input end of the first matching circuit X1 is connected to the first filter circuit LC1, and is configured to receive the first differential signal that is obtained after filtering processing and that is output by the first filter circuit LC1. An input end of the second matching circuit X2 is connected to the second filter circuit LC2, and is configured to receive the second differential signal that is obtained after the filtering processing and that is output by the second filter circuit LC2. An output end of the first matching circuit X1 is connected to the first end of the transmitting coil 523. An output end of the second matching circuit X2 is connected to a second end of the transmitting coil 523. Both the first matching circuit X1 and the second matching circuit X2 may use a series-parallel capacitor resonant circuit. For example, refer to FIG. 16. The first matching circuit X1 includes the first series resonant capacitor $C_{11}$ and the first parallel resonant capacitor $C_{21}$. The second matching circuit X2 includes the second series resonant capacitor $C_{12}$ and the second parallel resonant capacitor $C_{22}$. The first end of the first series resonant capacitor Cu is connected to the input end of the first matching circuit X1. The second end of the first series resonant capacitor C ii is connected to the first end of the first parallel resonant capacitor $C_{21}$. The second end of the first series resonant capacitor $C_{11}$ is connected to the first end of the transmitting coil 523. The first end of the second series resonant capacitor $C_{12}$ is connected to the input end of the second matching circuit X2. The second end of the second series resonant capacitor $C_{12}$ is connected to the first end of the second parallel resonant capacitor $C_{22}$. The second end of the second series resonant capacitor $C_{12}$ is connected to the first end of the transmitting coil 523. The second end of the first parallel resonant capacitor $C_{21}$ and the second end of the second parallel resonant capacitor $C_{22}$ are connected to the ground Vss.

Based on the foregoing terminal device, an embodiment of this application further provides an apparatus for controlling a terminal device, configured to control a resistance switching circuit. The apparatus for controlling a terminal device may be a chip or a functional circuit that is separately disposed in the terminal device, or may be a functional entity integrated into a chip in the terminal device. The apparatus for controlling a terminal device is configured to implement a method for controlling the terminal device, and includes the following operations.

201: Control a resistance switching circuit to adjust a value Q of a transmitting circuit by changing a resistance value of the resistance switching circuit.

In an embodiment, operation 201 includes the following operations S1 and S2.

S1: When it is determined that the alternating current power signal is used to charge another terminal device, control the resistance switching circuit to adjust the resistance value of the resistance switching circuit to a second resistance value.

When the resistance switching circuit includes at least one switch and at least one resistor, the at least one switch and the at least one resistor form a resistance switching network. The resistance switching circuit may adjust a state of the switch to adjust the resistance value of the resistance switching circuit to the second resistance value. Refer to FIG. 14 or FIG. 15, when the resistance switching circuit 524 includes the first switch S and the first resistor $R_d$, operation 201 may control the resistance switching circuit to short-circuit the first switch S. Refer to FIG. 16. When the resistance switching circuit 524 includes a first resistor $R_{d1}$, a second resistor $R_{d2}$, a first switch S1, and a second switch S2, operation 201 may control the resistance switching circuit to short-circuit the first switch S1 and the second switch S2. Refer to FIG. 17. When the resistance switching circuit includes the first resistor $R_d$, the first switch S1, and the second switch S2, operation 201 may control the resistance switching circuit to short-circuit the first switch S1 and the second switch S2. Refer to FIG. 18. When the resistance switching circuit includes the first switch S1, the first resistor $R_{d1}$, and the second resistor $R_{d2}$, operation 201 may control the resistance switching circuit to short-circuit the first switch S1. Refer to FIG. 19. When the resistance switching circuit includes the first switch S1 and the first resistor $R_d$, operation 201 may control the resistance switching circuit to short-circuit the first switch S1. Refer to FIG. 20. When the resistance switching circuit includes the adjustable resistor, operation 201 may control the resistance switching circuit to adjust the adjustable resistor $R_j$ to a smaller resistance R1.

S2: When it is determined that the alternating current power signal is used to transmit a communication signal to another terminal device, control the resistance switching circuit to adjust the resistance value of the resistance switching circuit to a first resistance value.

When the resistance switching circuit includes at least one switch and at least one resistor, the at least one switch and the at least one resistor form a resistance switching network. The resistance switching circuit may adjust a state of the switch to adjust the resistance value of the resistance switching circuit to the first resistance value. Refer to FIG. 14 or FIG. 15, when the resistance switching circuit 524 includes the first switch S and the first resistor $R_d$, operation 201 may control the resistance switching circuit to open-circuit the first switch S. Refer to FIG. 16. When the resistance switching circuit 524 includes a first resistor $R_{d1}$, a second resistor $R_{d2}$, a first switch S1, and a second switch S2, operation 201 may control the resistance switching circuit to open-circuit the first switch S1 and the second switch S2. Refer to FIG. 17. When the resistance switching circuit includes the first resistor $R_d$, the first switch S1, and the second switch S2, operation 201 may control the resistance switching circuit to open-circuit the first switch S1 and the second switch S2. Refer to FIG. 18. When the resistance switching circuit includes the first switch S1, the first resistor $R_{d1}$, and the second resistor $R_{d2}$, operation 201 may control the resistance switching circuit to open-circuit the first switch S1. Refer to FIG. 19. When the resistance switching circuit includes the first switch S1 and the first resistor $R_d$, operation 201 may control the resistance switching circuit to open-circuit the first switch S1. Refer to FIG. 20. When the resistance switching circuit includes the adjustable resistor, operation 201 may control the resistance switching circuit to adjust the adjustable resistor $R_j$ to a larger resistance R2.

When the resistance switching circuit adjusts the resistance value of the resistance switching circuit to the first resistance value, the value Q of the transmitting circuit is a first value Q. When the resistance switching circuit adjusts the resistance value of the resistance switching circuit to the second resistance value, the value Q of the transmitting circuit is a second value Q. The first resistance value is greater than the second resistance value, and the first value Q is less than the second value Q.

Before operation S1, a type of the other terminal device needs to be determined. It is determined, based on the type of the another terminal device, that the alternating current power signal is used to charge the other terminal device, or that the alternating current power signal is used to transmit the communication signal to the other terminal device. Certainly, the apparatus for controlling a terminal device may determine a type of the other terminal device according to a communication protocol sent by the other terminal. The apparatus for controlling a terminal device may receive the communication protocol in a wireless communication manner, for example, Bluetooth, wireless broadband, ZigBee protocol, RFID, or a remote wireless technology. Certainly, the type of the other terminal device may also be determined by using the communication protocol received by the transmitting apparatus provided in this embodiment of this application. Certainly, in this case, the terminal device needs to be controlled to work in a wireless communication mode. In other words, the resistance switching circuit adjusts the resistance value of the resistance switching circuit to the first resistance value. Because the type of the other terminal device needs to be first determined before operation S1, a default working status of the terminal device is the wireless communication mode. In other words, when it is determined that the other terminal device needs to be charged, the terminal device switches to a wireless charging mode.

In conclusion, the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:
1. A terminal device, comprising:
a display screen;
a housing;
a middle frame disposed between the display screen and the housing; and
a transmitting circuit disposed on a side of the middle frame and facing the housing, wherein the transmitting circuit comprises a matching network and a transmitting coil connected to the matching network, the matching network is configured to perform impedance match- ing on a received alternating current power signal and then send the received alternating current power signal to the transmitting coil, the matching network comprises a parallel resonant capacitor connected in parallel to the transmitting coil;

wherein the transmitting circuit further comprises a resistance switching circuit configured to change a resistance value of the resistance switching circuit to adjust a quality factor value Q of the transmitting circuit, wherein the resistance switching circuit is directly connected in series to the parallel resonant capacitor, wherein the parallel resonant capacitor is coupled to an electrical ground.

2. The terminal device according to claim 1, wherein
the resistance switching circuit comprises an adjustable resistor, and the resistance switching circuit is configured to change a resistance value of the adjustable resistor to change the resistance value of the resistance switching circuit; or the resistance switching circuit comprises at least one switch and at least one resistor forming a resistance switching network, and the resistance switching network is configured to switch on and off the at least one switch to change the resistance value of the resistance switching circuit.

3. The terminal device according to claim 1, wherein
the matching network further comprises a series resonant capacitor;

a first end of the series resonant capacitor is configured to receive the alternating current power signal, a second end of the series resonant capacitor is connected to a first end of the parallel resonant capacitor, and a second end of the parallel resonant capacitor is connected to the ground; and the resistance switching circuit is connected in series to the first end or the second end of the parallel resonant capacitor.

4. The terminal device according to claim 3, wherein
the resistance switching circuit comprises a first switch and a first resistor, wherein a first end of the first switch is connected to a first end of the first resistor, and a second end of the first switch is connected to a second end of the first resistor; and the first end of the first switch is connected to the second end of the series resonant capacitor, and the second end of the first switch is connected to the first end of the parallel resonant capacitor; or the first end of the first switch is connected to the second end of the parallel resonant capacitor, and the second end of the first switch is connected to the ground.

5. The terminal device according to claim 1, wherein the matching network further comprises a first matching circuit and a second matching circuit, the first matching circuit comprises a first series resonant capacitor and a first parallel resonant capacitor, the second matching circuit comprises a second series resonant capacitor and a second parallel resonant capacitor, a first end of the first series resonant capacitor and a first end of the second series resonant capacitor are configured to receive the alternating current power signal, a second end of the first series resonant capacitor is connected to a first end of the first parallel resonant capacitor, and a second end of the second series resonant capacitor is connected to a first end of the second parallel resonant capacitor; and the resistance switching circuit is connected in series between a second end of the first parallel resonant capacitor and a second end of the second parallel resonant capacitor.

6. The terminal device according to claim 5, wherein
the resistance switching circuit comprises a first resistor, a second resistor, a first switch, and a second switch, wherein a first end of the first switch is connected to a first end of the first resistor, a first end of the second switch is connected to a first end of the second resistor, a second end of the first switch is connected to a second end of the second switch, a second end of the first resistor is connected to a second end of the second resistor, the second end of the second switch is connected to a ground, a second end of the second resistor is connected to the ground, the first end of the first resistor is connected to the second end of the first parallel resonant capacitor, and the first end of the second resistor is connected to the second end of the second parallel resonant capacitor; or the resistance switching circuit comprises a first resistor, a first switch, and a second switch, wherein a first end of the first switch is connected to a first end of the first resistor, a second end of the second switch is connected to a second end of the first resistor, a second end of the first switch is connected to the second end of the second switch, the second end of the first switch is connected to a ground, the first end of the first resistor is connected to the second end of the first parallel resonant capacitor, and the second end of the first resistor is connected to the second end of the second parallel resonant capacitor; or the resistance switching circuit comprises a first switch, a first resistor, and a second resistor, wherein a first end of the first switch is connected to a first end of the first resistor, a second end of the first switch is connected to a first end of the second resistor, a second end of the first resistor is connected to a second end of the second resistor, the second end of the first resistor is connected to a ground, the first end of the first resistor is connected to the second end of the first parallel resonant capacitor, and the first end of the second resistor is connected to the second end of the second parallel resonant capacitor; or the resistance switching circuit comprises a first switch and a first resistor, wherein a first end of the first switch is connected to a first end of the first resistor, a second end of the first switch is connected to a second end of the first resistor, the first end of the first resistor is connected to the second end of the first parallel resonant capacitor, and the second end of the first resistor is connected to the second end of the second parallel resonant capacitor.

7. A terminal device, comprising:
a display screen;
a housing;
a middle frame disposed between the display screen and the housing; and
a transmitting circuit disposed on a side of the middle frame and facing the housing, wherein the transmitting circuit comprises a filter circuit, a matching network connected to the filter circuit, and a transmitting coil connected to the matching network, the filter circuit is configured to filter a received alternating current power signal, the matching network is configured to perform impedance matching on the filtered alternating current power signal and then send the filtered alternating current power signal to the transmitting coil, the filter circuit uses an inductor-capacitor LC filter circuit, the filter circuit comprises a filter capacitor;
wherein the transmitting circuit further comprises a resistance switching circuit configured to change a resistance value of the resistance switching circuit to adjust a quality factor value Q of the transmitting circuit, and the resistance switching circuit is directly connected in series to the filter capacitor, wherein the filter capacitor is coupled to an electrical ground.

8. The terminal device according to claim 7, wherein
the resistance switching circuit comprises an adjustable resistor, and the resistance switching circuit is configured to change a resistance value of the adjustable resistor to change the resistance value of the resistance switching circuit; or
the resistance switching circuit comprises at least one switch and at least one resistor forming a resistance switching network, and the resistance switching network is configured to switch on and off the at least one switch to change the resistance value of the resistance switching circuit.

9. The terminal device according to claim 7, wherein
the filter circuit further comprises a filter inductor;
a first end of the filter inductor is configured to receive the alternating current power signal, a second end of the filter inductor is connected to a first end of the filter capacitor, a second end of the filter capacitor is connected to the ground, and the second end of the filter inductor is connected to the matching network; and
the resistance switching circuit is connected in series to the first end or the second end of the filter capacitor.

10. The terminal device according to claim 7, wherein
the filter circuit further comprises a first filter circuit and a second filter circuit, the first filter circuit comprises a first filter inductor and a first filter capacitor, and the second filter circuit comprises a second filter inductor and a second filter capacitor;
a first end of the first filter inductor and a first end of the second filter inductor are configured to receive the alternating current power signal, a second end of the first filter inductor is connected to a first end of the first filter capacitor, the second end of the first filter inductor is connected to the matching network, a second end of the second filter inductor is connected to a first end of the second filter capacitor, and the second end of the second filter inductor is connected to the matching network; and
the resistance switching circuit is connected in series between a second end of the first filter capacitor and a second end of the second filter capacitor.

11. A method for controlling a terminal device, comprising:
controlling a resistance switching circuit to adjust a quality factor value Q of a transmitting circuit by changing a resistance value of the resistance switching circuit, wherein the terminal device comprises a display screen, a housing, a middle frame disposed between the display screen and the housing, and a transmitting circuit is disposed on a side of the middle frame and facing the housing, the transmitting circuit comprises a matching network and a transmitting coil connected to the matching network, the matching network is configured to perform impedance matching on a received alternating current power signal and then send the received alternating current power signal to the transmitting coil, the matching network comprises a parallel resonant capacitor connected in parallel to the transmitting coil, and the transmitting circuit further comprises a resistance switching circuit directly connected in series to the parallel resonant capacitor, wherein the parallel resonant capacitor is coupled to an electrical ground.

12. The method according to claim 11, wherein controlling the resistance switching circuit to adjust the quality factor value Q of the transmitting circuit comprises:
when it is determined that an alternating current power signal is used to charge another terminal device, controlling the resistance switching circuit to change the resistance value of the resistance switching circuit to a second resistance value; or
when it is determined that an alternating current power signal is used to transmit a communication signal to another terminal device, controlling the resistance switching circuit to change the resistance value of the resistance switching circuit to a first resistance value, wherein when the resistance switching circuit changes the resistance value of the resistance switching circuit to the first resistance value, the quality factor value Q of the transmitting circuit is a first quality factor value, when the resistance switching circuit changes the resistance value of the resistance switching circuit to the second resistance value, the quality factor value Q of the transmitting circuit is a second quality factor value, the first resistance value is greater than the second resistance value, and the first quality factor value is less than the second quality factor value.

13. The method according to claim 12, wherein before controlling the resistance switching circuit to adjust the quality factor value Q of the transmitting circuit, the method further comprises:
detecting a type of the other terminal device; and
determining, based on the type of the other terminal device, that the alternating current power signal is used to charge the other terminal device, or that the alternating current power signal is used to transmit the communication signal to the other terminal device.

* * * * *